July 24, 1956 W. A. BLACK 2,755,995
ELAPSED TIME RECORDER
Filed March 17, 1953 21 Sheets-Sheet 1
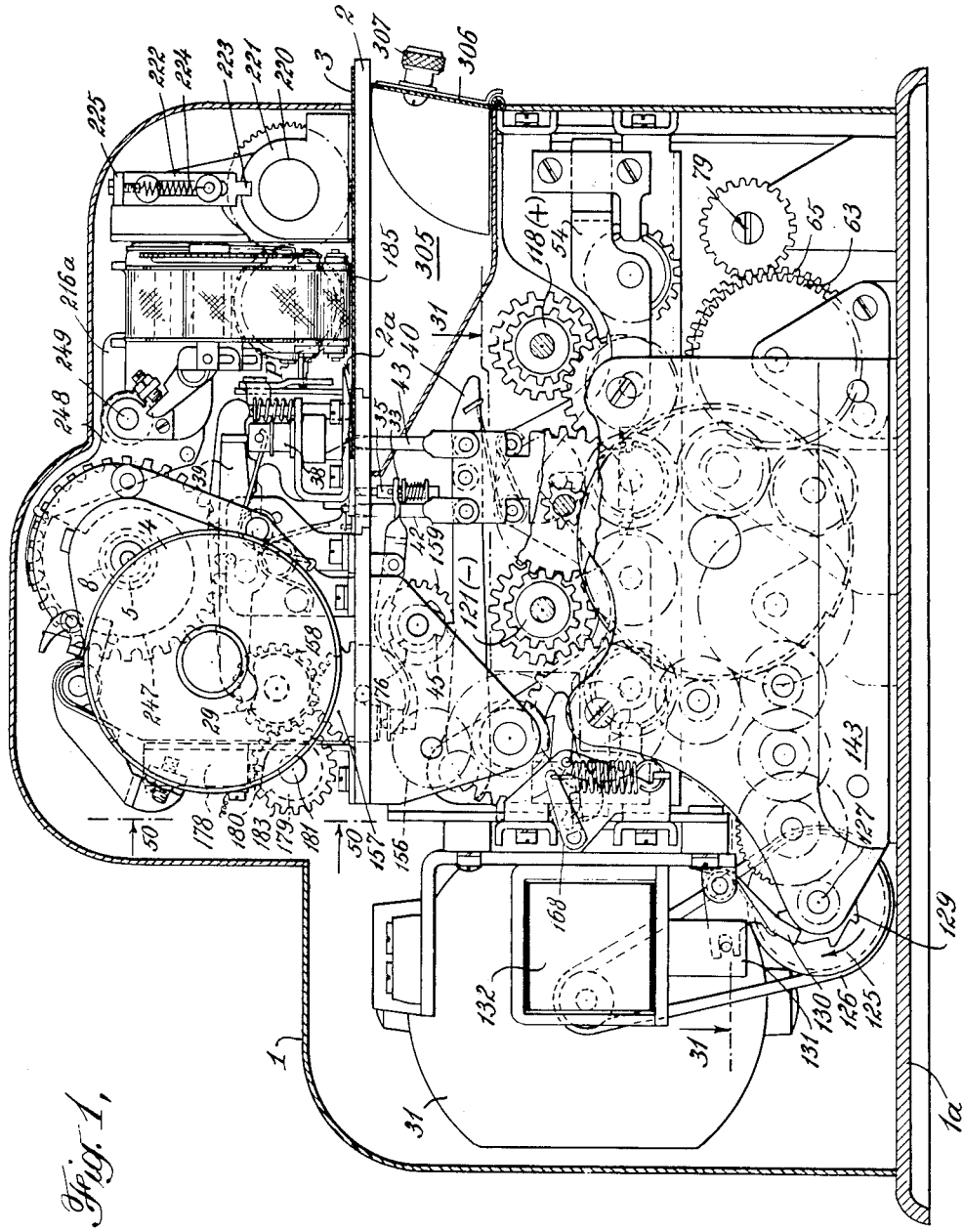
Fig. 1.
INVENTOR
WILLIAM A. BLACK
BY 
ATTORNEY July 24, 1956

W. A. BLACK 2,755,995

ELAPSED TIME RECORDER

Filed March 17, 1953

INVENTOR
WILLIAM A. BLACK
BY
ATTORNEY

July 24, 1956  W. A. BLACK  2,755,995
ELAPSED TIME RECORDER
Filed March 17, 1953  21 Sheets-Sheet 4

INVENTOR
WILLIAM A. BLACK
BY
ATTORNEY

July 24, 1956  W. A. BLACK  2,755,995
ELAPSED TIME RECORDER
Filed March 17, 1953  21 Sheets-Sheet 5

INVENTOR
WILLIAM A BLACK
BY
ATTORNEY

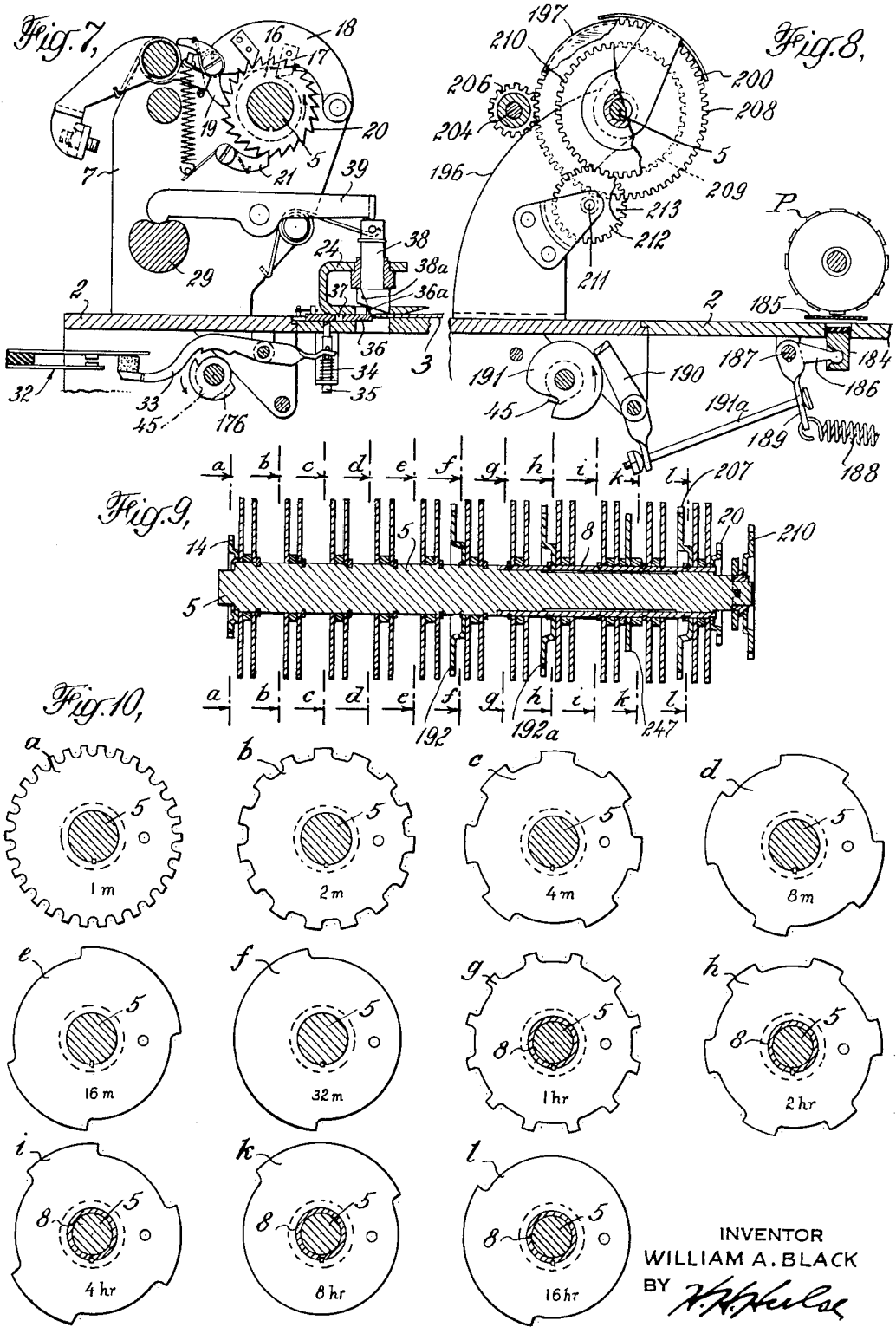

July 24, 1956  W. A. BLACK  2,755,995
ELAPSED TIME RECORDER
Filed March 17, 1953  21 Sheets-Sheet 8
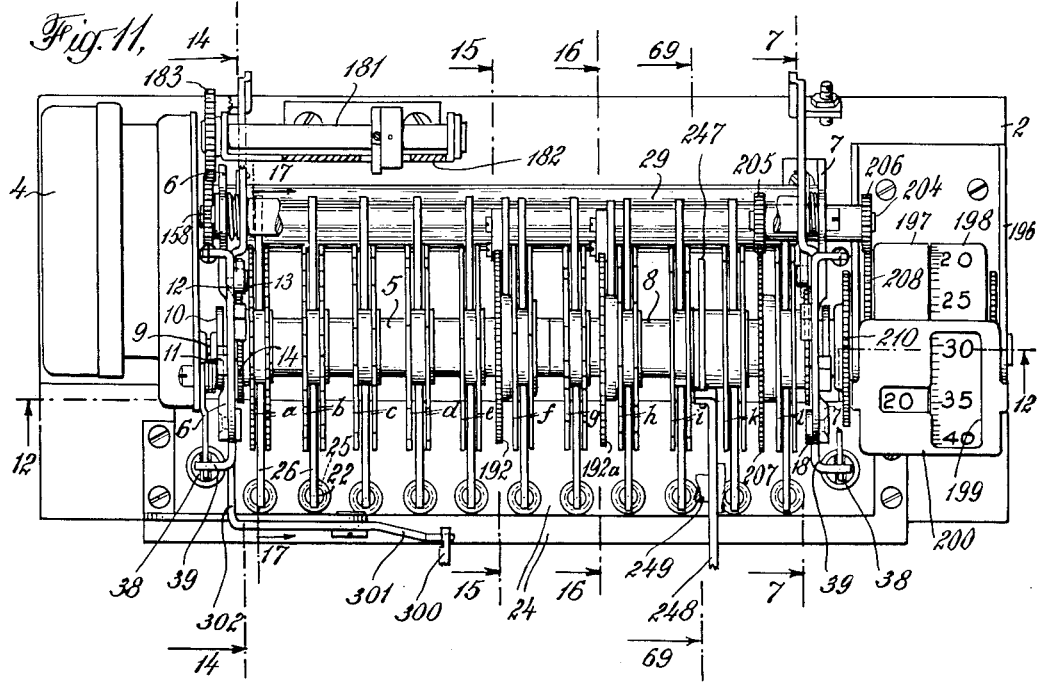
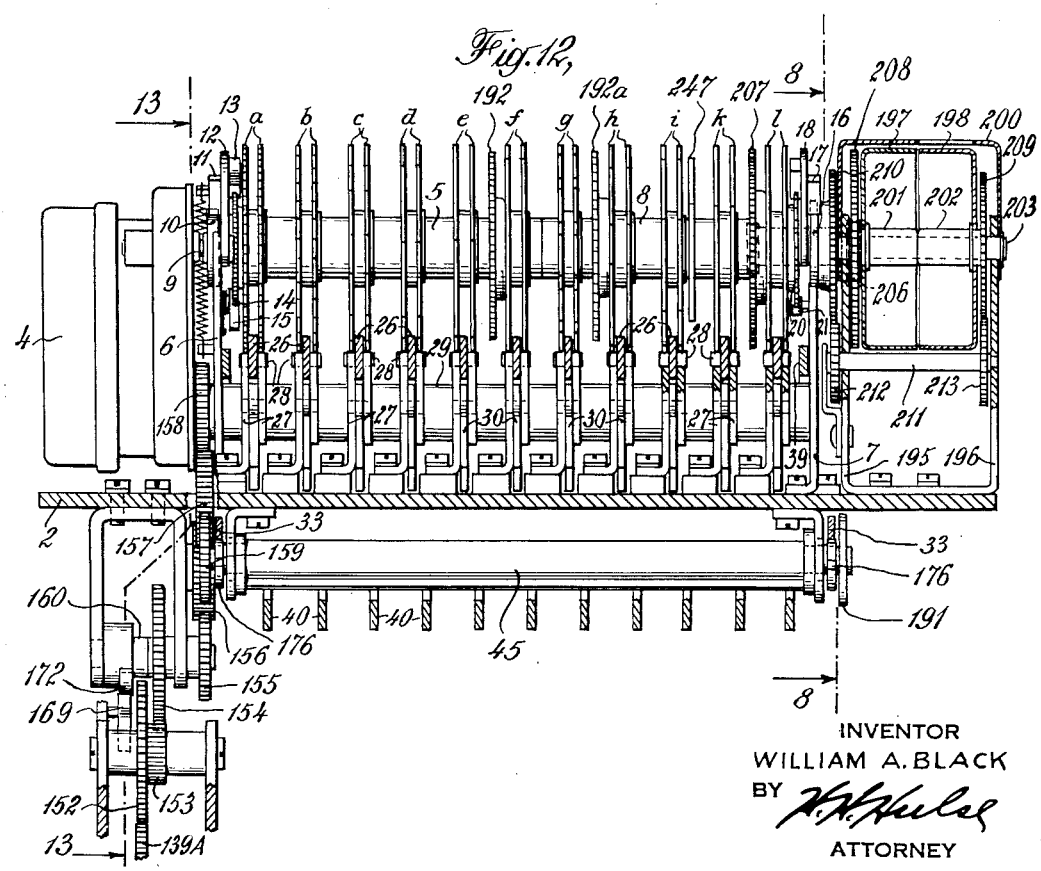
INVENTOR
WILLIAM A. BLACK
BY
ATTORNEY

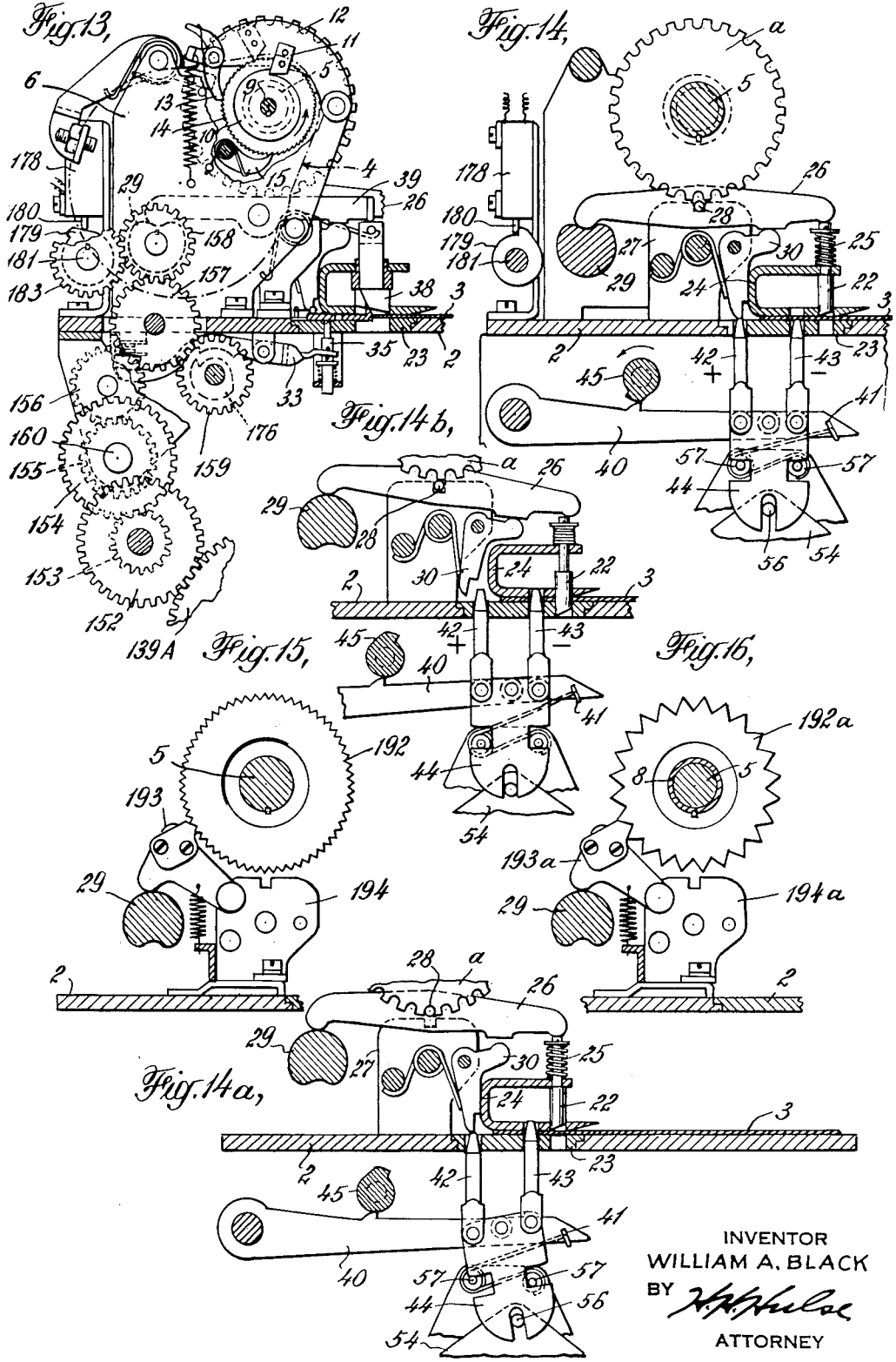

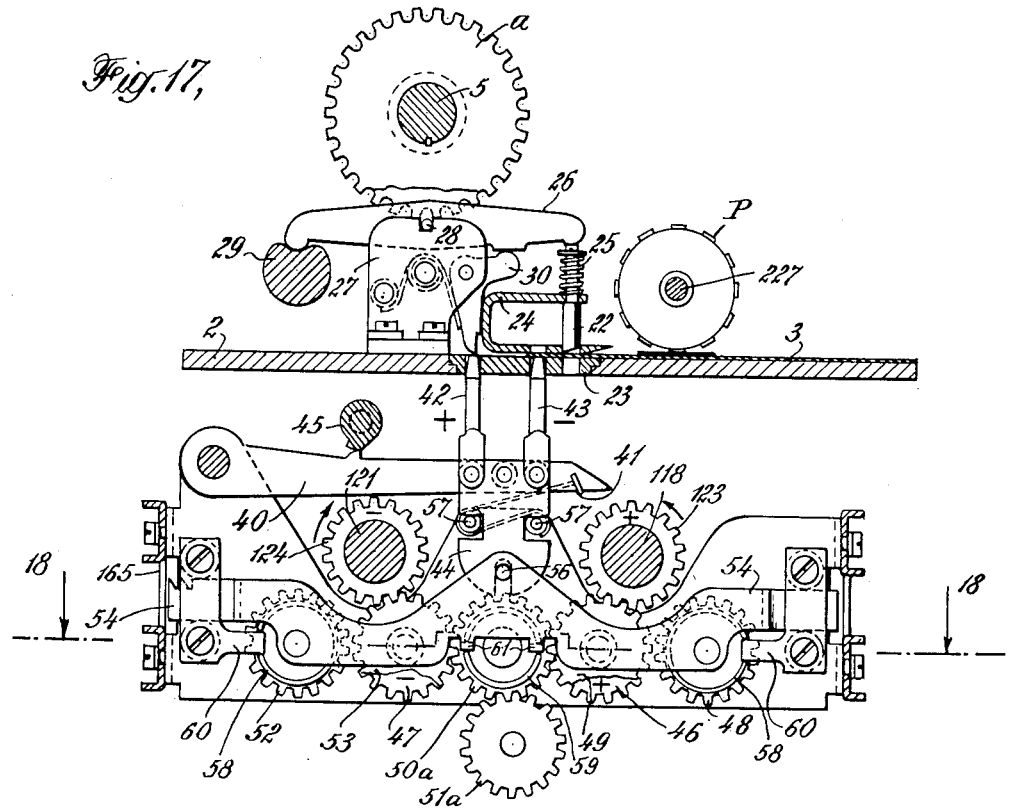

July 24, 1956
W. A. BLACK
2,755,995
ELAPSED TIME RECORDER
Filed March 17, 1953
21 Sheets-Sheet 11
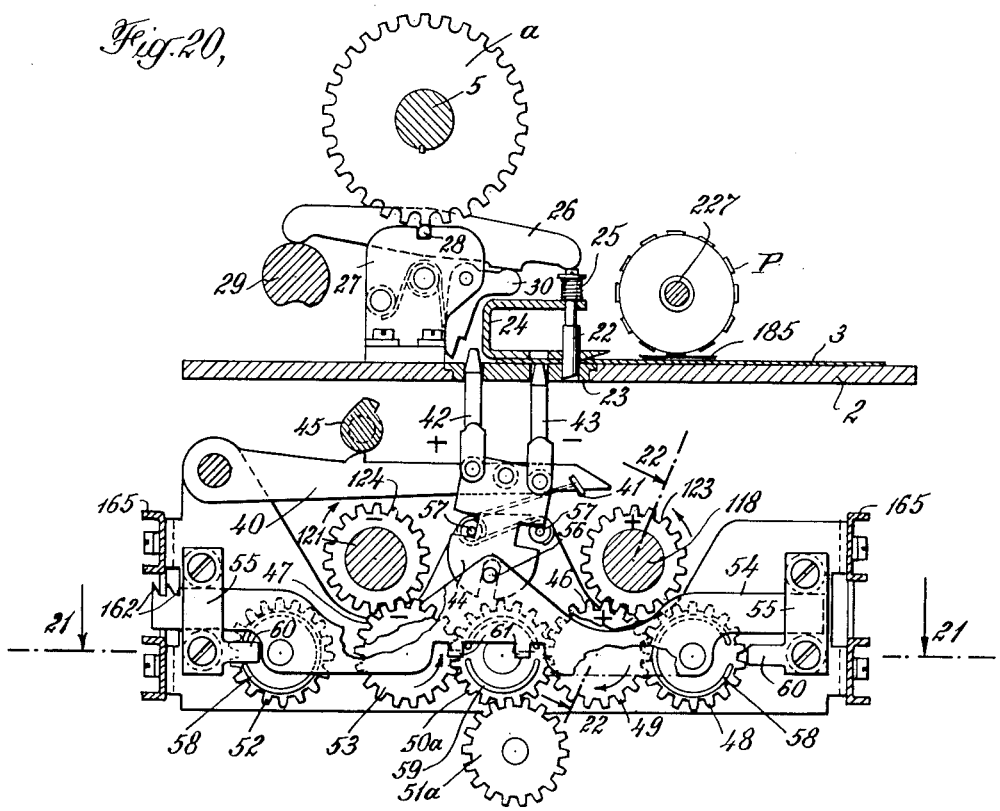
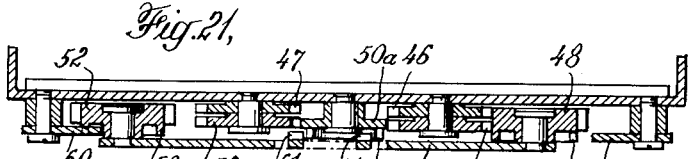
INVENTOR
WILLIAM A. BLACK
BY
ATTORNEY

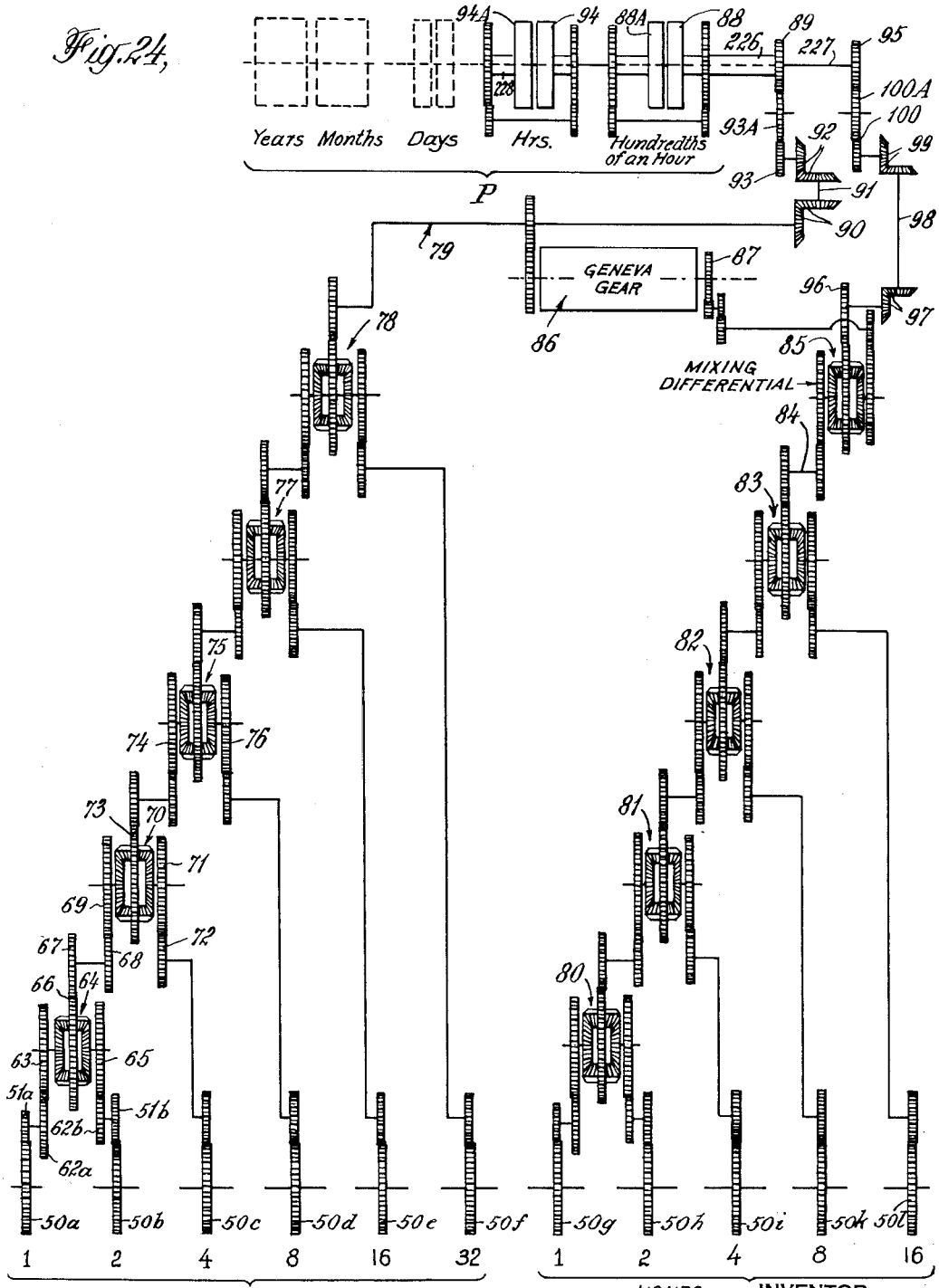

July 24, 1956 W. A. BLACK 2,755,995
ELAPSED TIME RECORDER
Filed March 17, 1953 21 Sheets-Sheet 13
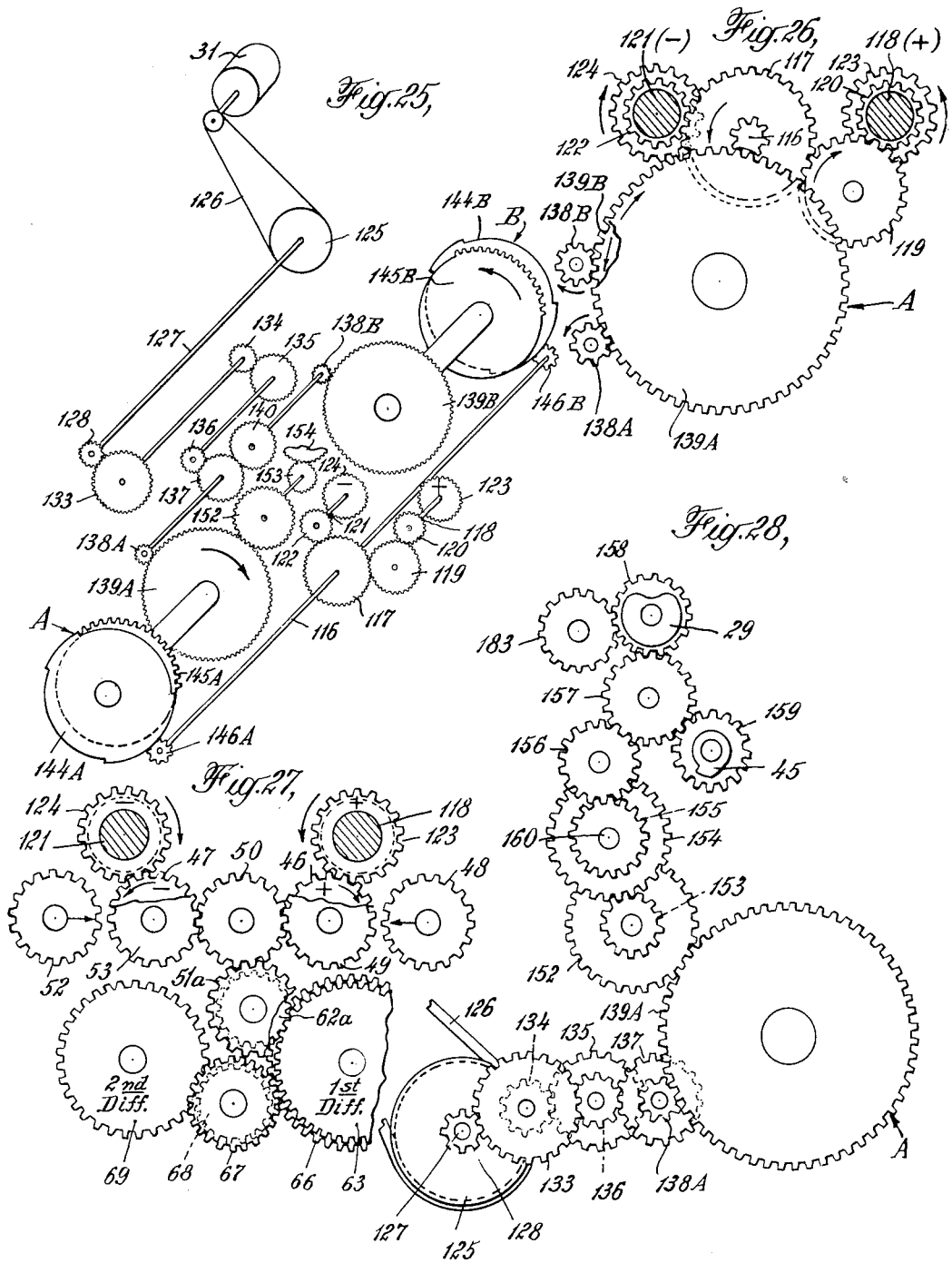
INVENTOR
WILLIAM A BLACK
BY
ATTORNEY July 24, 1956
W. A. BLACK
2,755,995
ELAPSED TIME RECORDER
Filed March 17, 1953
21 Sheets-Sheet 14
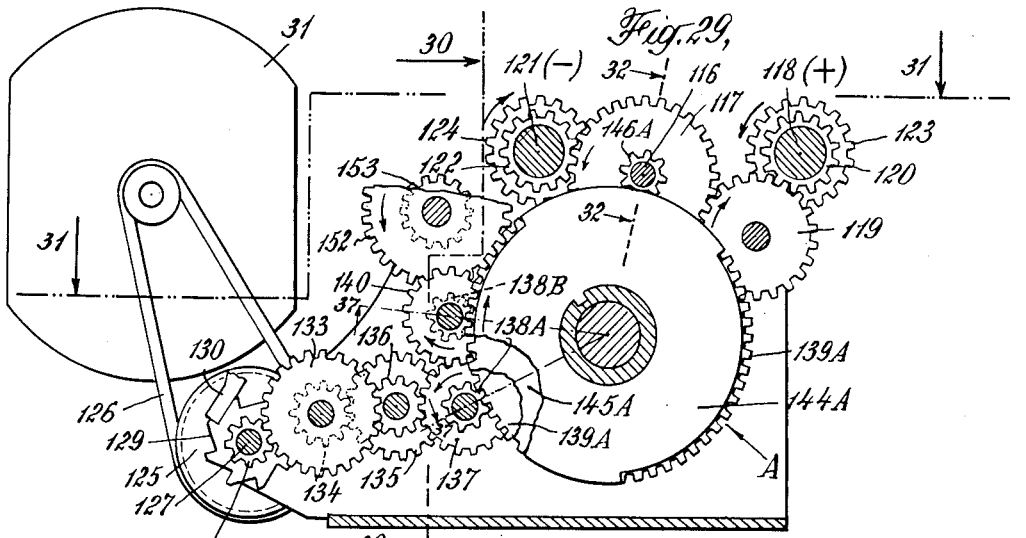
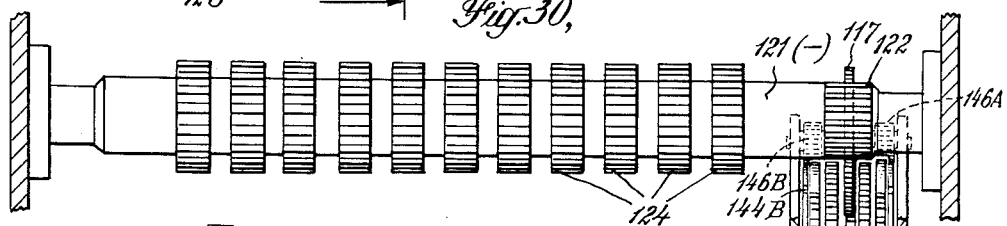
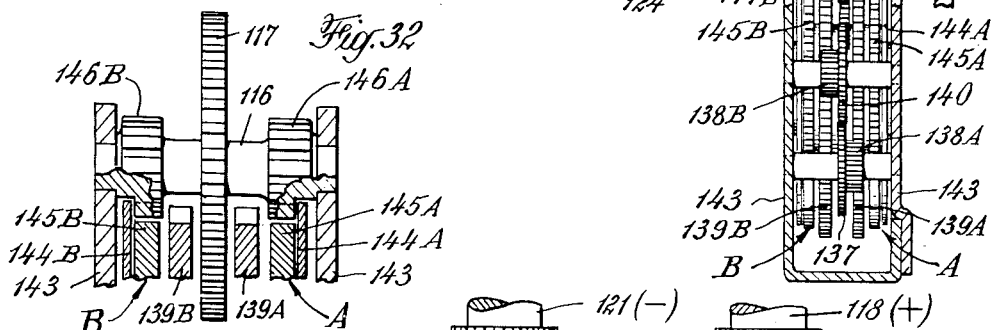
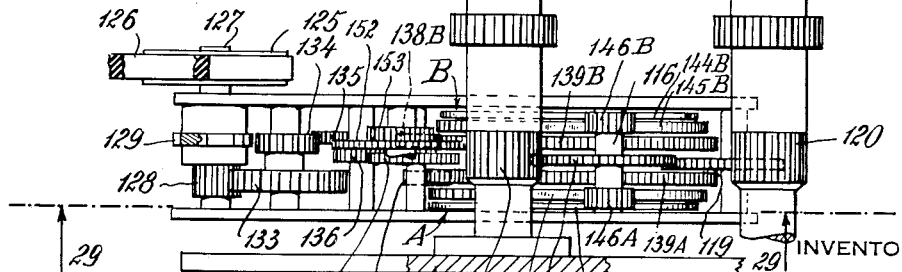
INVENTOR
WILLIAM A. BLACK
BY
ATTORNEY July 24, 1956
W. A. BLACK
2,755,995
ELAPSED TIME RECORDER
Filed March 17, 1953
21 Sheets-Sheet 15
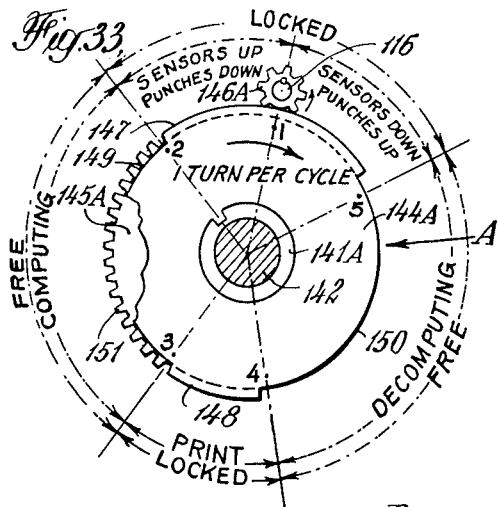
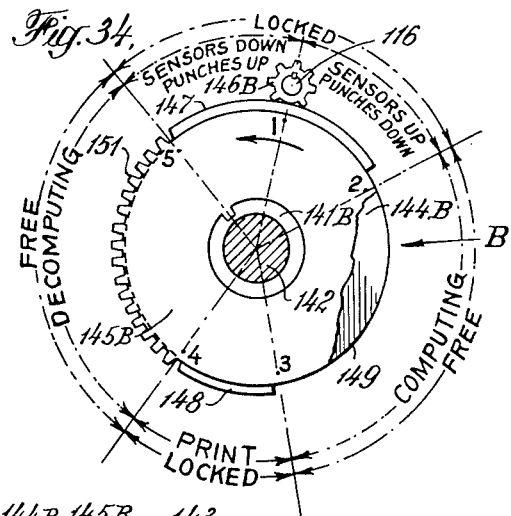
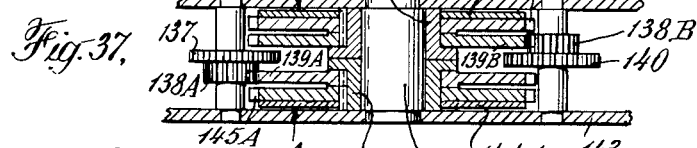
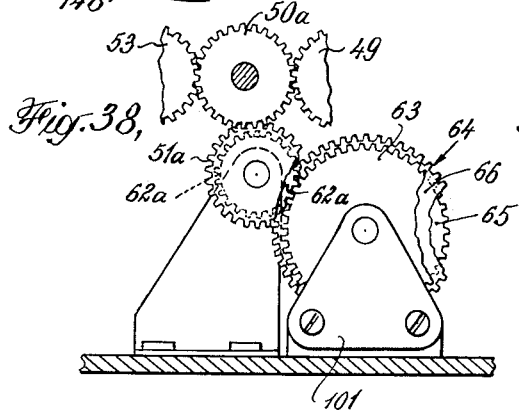
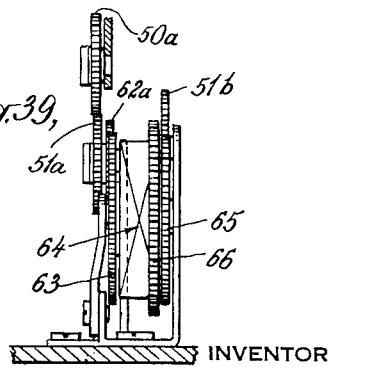
INVENTOR
WILLIAM A BLACK
BY
ATTORNEY July 24, 1956  W. A. BLACK  2,755,995
ELAPSED TIME RECORDER
Filed March 17, 1953  21 Sheets-Sheet 16
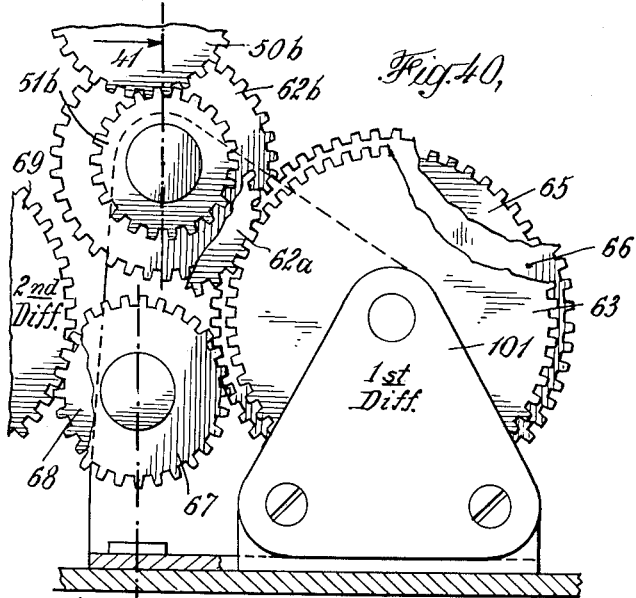
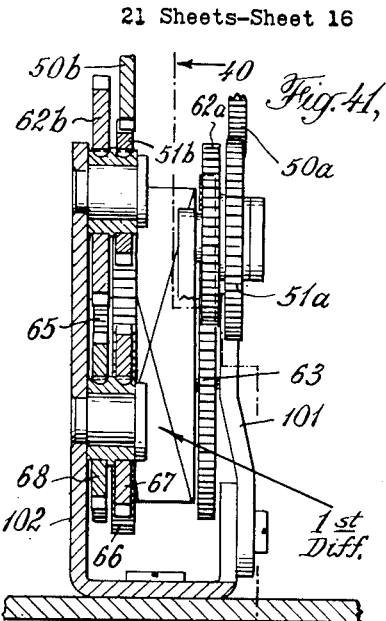
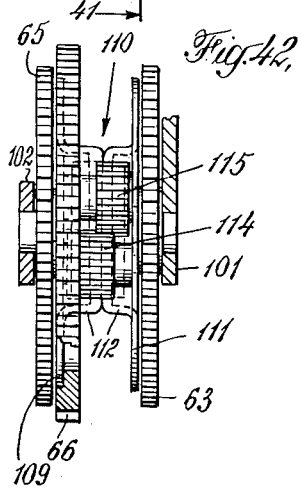
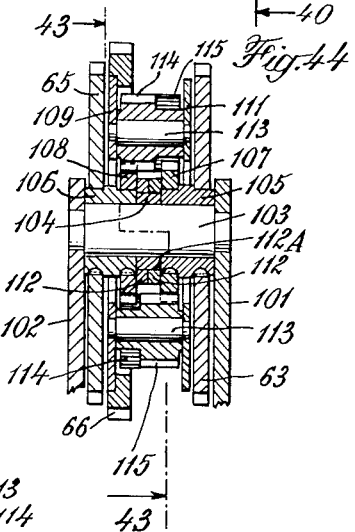
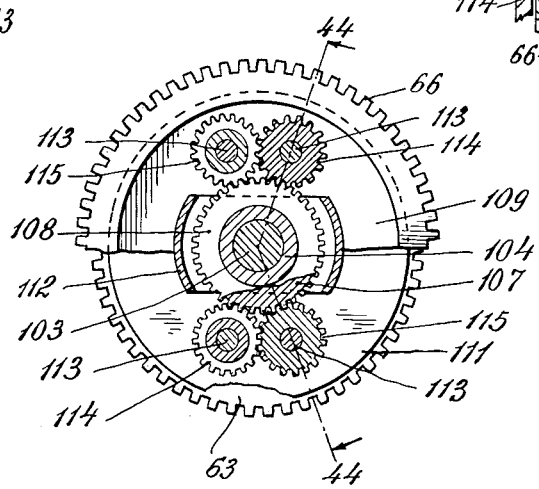
INVENTOR
WILLIAM A. BLACK
BY
ATTORNEY July 24, 1956 W. A. BLACK 2,755,995
ELAPSED TIME RECORDER
Filed March 17, 1953 21 Sheets-Sheet 17
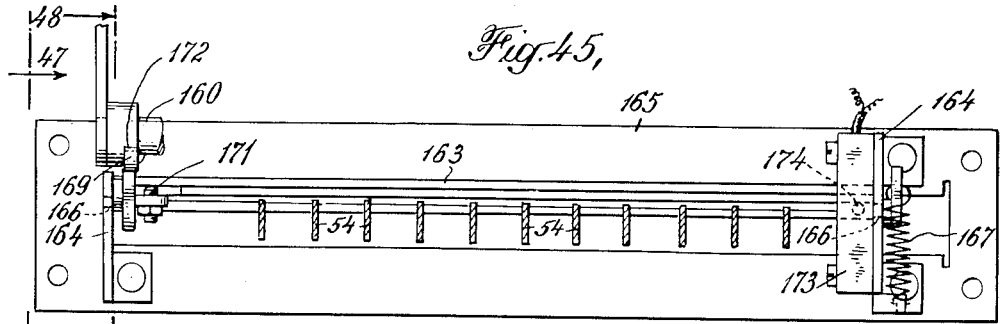
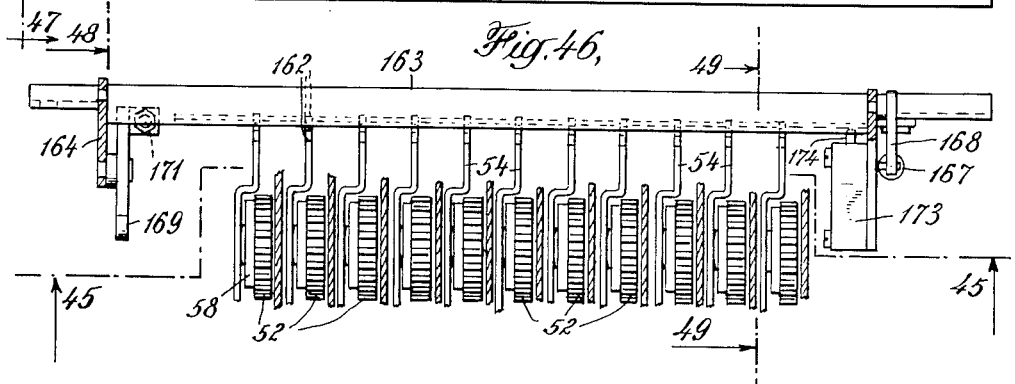
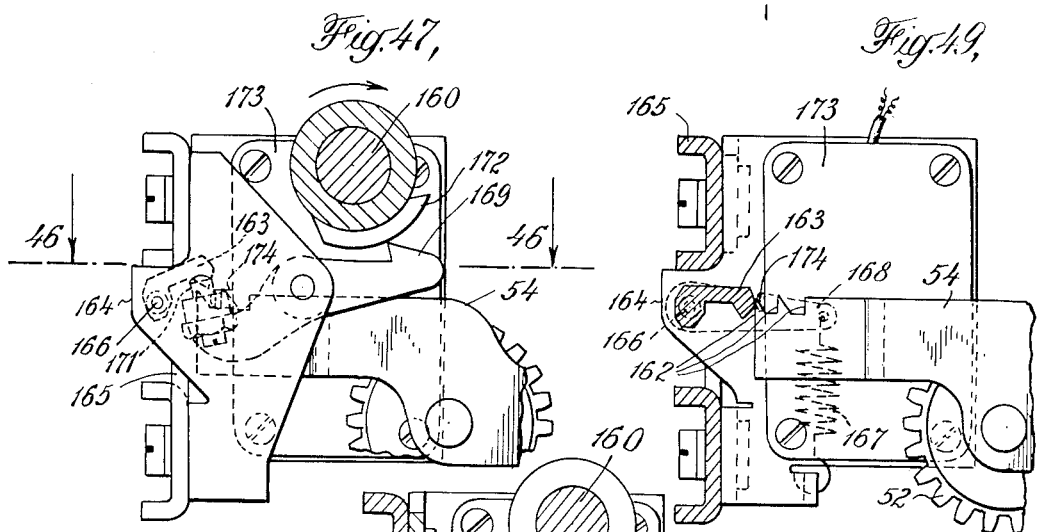
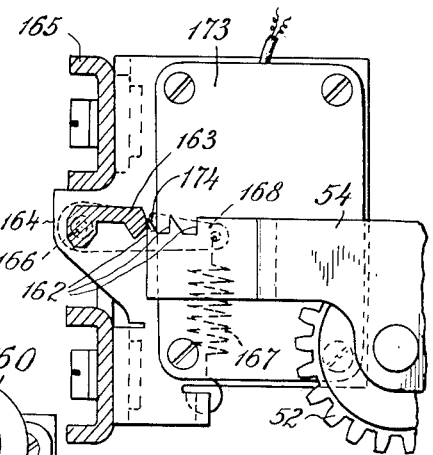
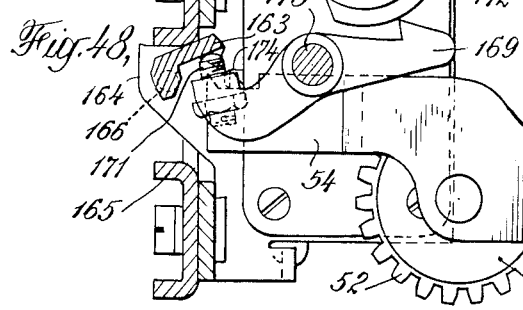
INVENTOR
WILLIAM A. BLACK
BY
ATTORNEY July 24, 1956　　　　W. A. BLACK　　　　2,755,995
ELAPSED TIME RECORDER
Filed March 17, 1953　　　　　　　　　　21 Sheets-Sheet 18
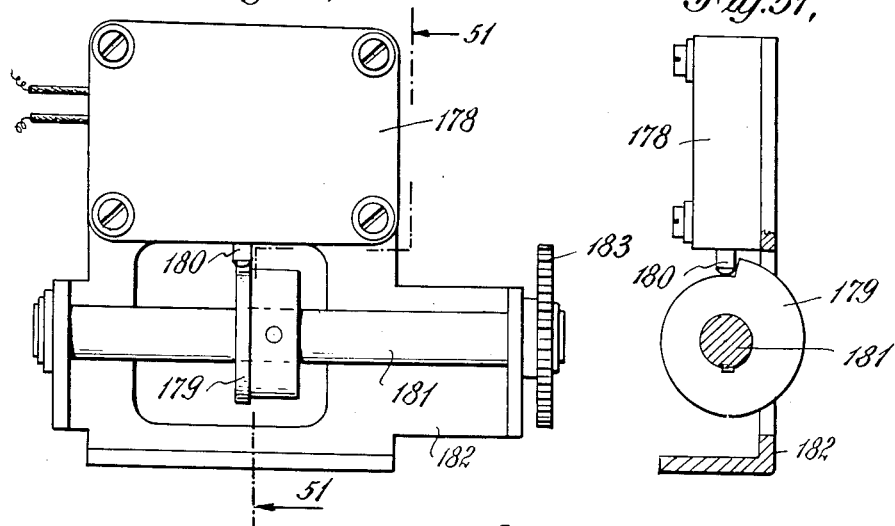
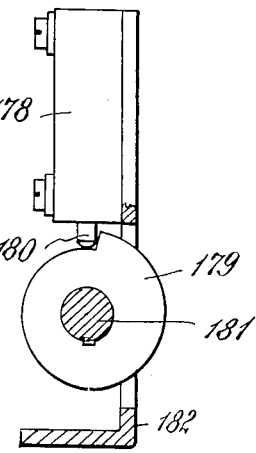
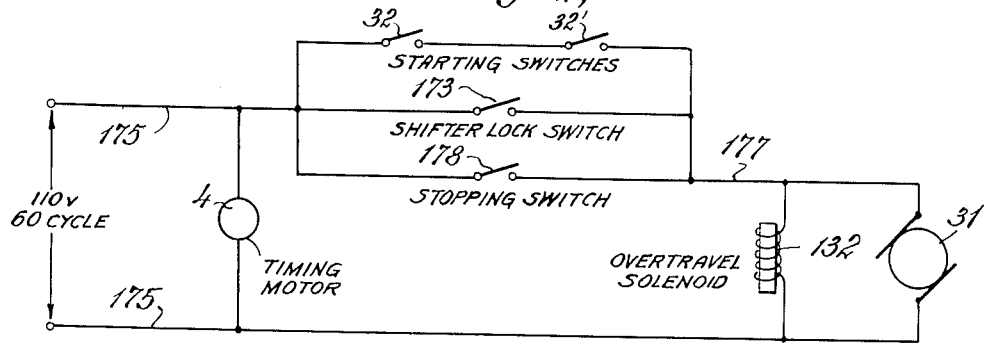
INVENTOR
WILLIAM A. BLACK
BY
ATTORNEY

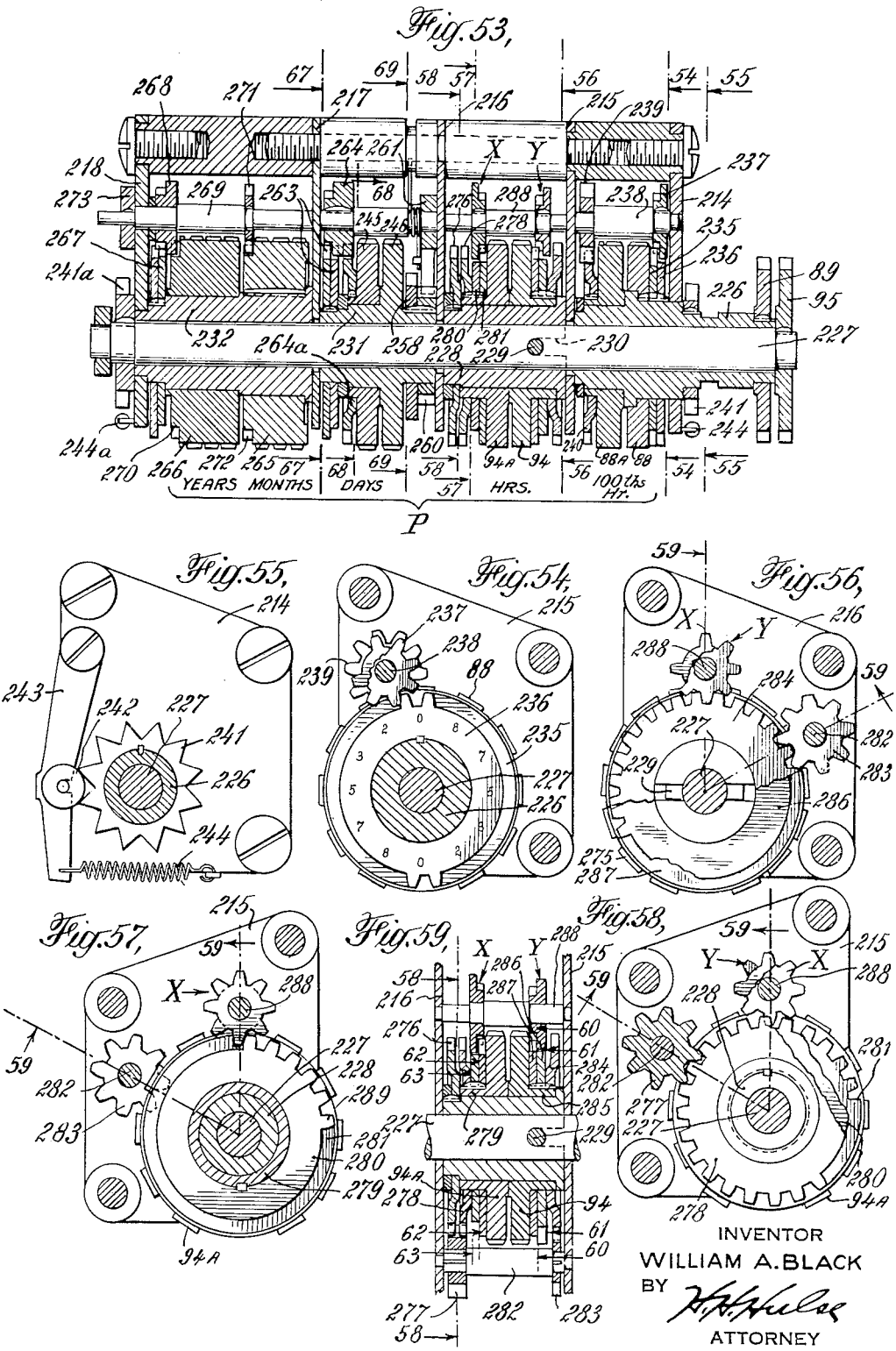

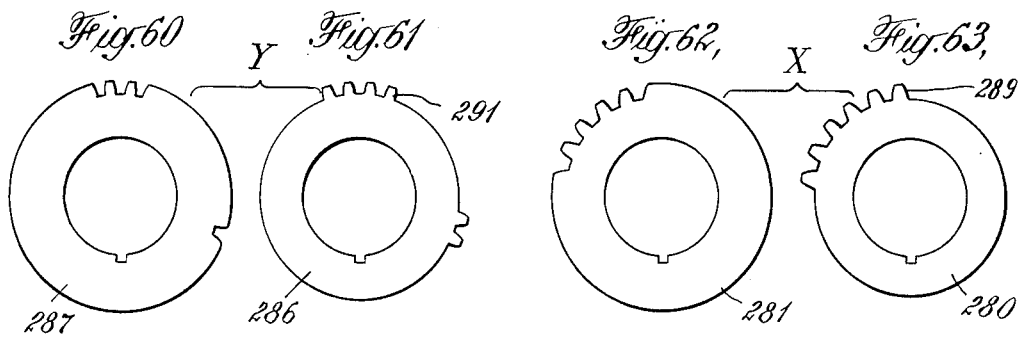
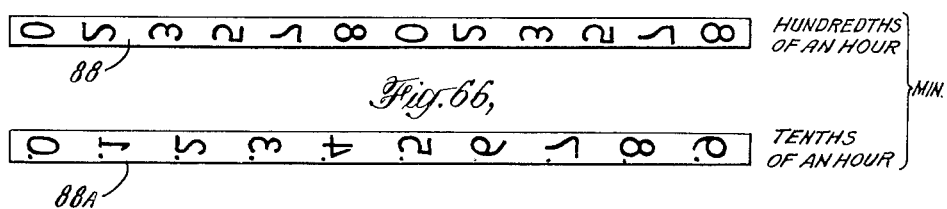
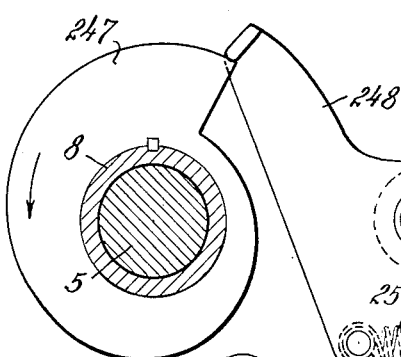
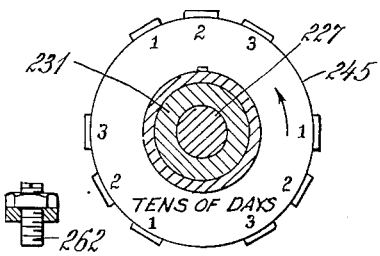
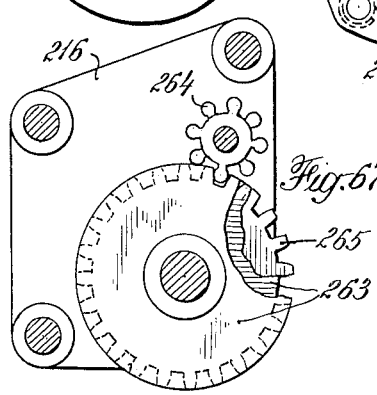
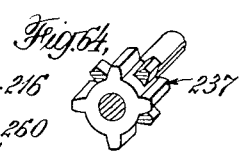

July 24, 1956
W. A. BLACK
2,755,995
ELAPSED TIME RECORDER
Filed March 17, 1953
21 Sheets—Sheet 21
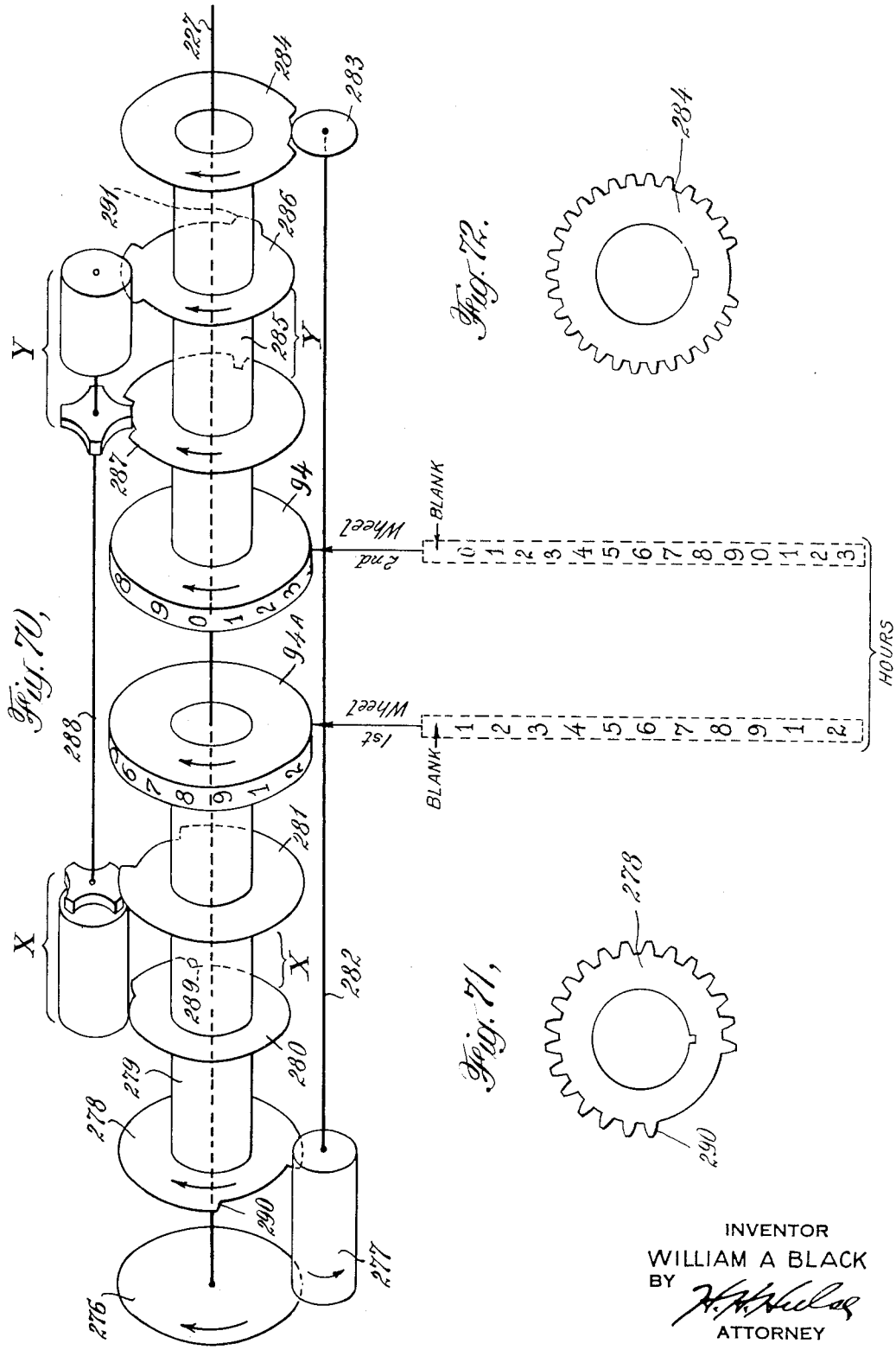
INVENTOR
WILLIAM A BLACK
BY
ATTORNEY

United States Patent Office 2,755,995
Patented July 24, 1956

2,755,995

ELAPSED TIME RECORDER

William A. Black, Montclair, N. J., assignor to General Time Corporation, New York, N. Y., a corporation of Delaware Application March 17, 1953, Serial No. 342,944

24 Claims. (Cl. 235—61.8)

This invention relates to elapsed time recorders and has for its object to provide a combined time clock and computing machine which will compute and record on a card inserted in the machine the time which has elapsed from the previous insertion of that card in the machine.

The primary object of the invention is to provide a machine which can be used simultaneously by any number of employees to accurately compute and record the elapsed time between the first and second insertions of a card in the machine, regardless of how many other cards are in the meantime inserted in the machine for either the first recording or for the second recording and computing.

The machine is particularly useful in cost accounting for computing the labor cost on individual jobs. Each workman is given a card inscribed with the job number. On beginning the work assigned to him the workman inserts the card in the machine, and upon completing the assignment, the card is again inserted in the machine. On the second insertion there will be printed on the card the elapsed time between the first and second insertions. The minutes are preferably printed in hundredths of an hour so that the multiplication of the elapsed time by the hourly rate charged will indicate in dollars and cents the actual labor cost of the job.

The machine has various other uses, for example, in laboratories where it is desired to accurately record the time to which a compound is subjected to a particular treatment. In using the machine each computation is an independent operation and no matter how many other computations may be made in the interval between the first and second insertion of the particular card, the machine will accurately compute the time between the first and second insertions of that particular card.

A further object of the invention is to provide a machine of the character described which is entirely mechanical in its operations, which is of small and compact design and which contains no fragile and delicate parts to get out of order.

With the above ends in view, my improved machine consists essentially of a series of punches arranged to record the time of day in hours and fractions of an hour (for examples, minutes), with a clock or time keeping mechanism, either spring or electrically driven, for setting the operating mechanism of the punches, the mechanism being so constructed and arranged that when a card is inserted in the device the punches will be operated to make holes in the card, the holes differing in number and arrangement for each hour and fraction of an hour of a 24-hour day. The machine also, on this first insertion of the card, cuts off portions of the card opposite the stop gauges which determine the extent to which the card may be introduced into the machine, so that, on the second introduction of the card into the machine, another portion of the card will come opposite the punches, and a second series of holes will be punched in the card, indicating the time of day in hours and fractions of an hour at which the card was inserted the second time.

The machine also includes a computing mechanism which is set in motion by the insertion of the card and operates a time printing mechanism to print on the card, at the first insertion, the time of day and, on the second insertion, the elapsed time between the two insertions. The printing mechanism is not operated directly by the time clock mechanism. Instead, the type wheels which print the time stand normally at "Zero" position and, at the first insertion of the card, are turned by the computing mechanism from the "Zero" position to the extent necessary to print the time of card insertion in hours and fractions of an hour.

On the second insertion of the card the computing mechanism is controlled, in part, by the setting mechanism for setting the operating mechanism of the punches, and, in part, by the holes punched in the card at the first insertion. The holes first punched in the card, will, on the second insertion of the card, overlie a series of sensors some of which, according to the number and arrangement of the holes, are projected through the holes of the card and serve as a second control of the computing mechanism. This second control may cause the time printing wheels, actuated by the computing mechanism, either to remain stationary or to operate in a direction reverse to the direction of operation effected in conjunction with the punches when operating to punch the holes indicating the time of day.

The computing mechanism, in effect, turns the type wheels forward from "Zero," that is, midnight, to the time of day at the second insertion and then turns them back through a distance corresponding to the time between "Zero" and the time of the first punching. The type wheels are thus set to print, in hours and fractions of an hour, the elapsed time between the first and second punchings. Actually, the two operations are accomplished simultaneously through differential gearing so that the printing wheels are in fact turned only from "Zero" position to a position to print the difference in time between the two punchings.

After each printing operation all parts of the computing mechanism, together with the type wheels, are re-set at "Zero," i. e., "decomputed," ready for the next card insertion. However, the punch controlling parts (referred to later as "time wheels") which are driven by the time clock mechanism, are always in the positions corresponding to the time of day. Hence, when another card is inserted, the machine will again punch and print the time of day on the card.

On the second insertion of any card it is punched to indicate the then time of day and, at the same time, the computing mechanism through the differential drive, adjusts the printing wheels so that the time printed on the card is the elapsed time since the first insertion of that particular card. The second printing completes the record on the card, which includes (1) two rows of holes whose arrangement and assigned value indicate the time of day at the first and second insertions, respectively; (2) a printed legend indicating the time of day at the first insertion, which legend may be printed following the words "Starting time," if the cards are to be used for determining labor cost; and (3) a second legend in hours and fractions of an hour showing the time between the first and second insertions, which legend can be printed following the words "Elapsed time."

In the accompanying drawings I have illustrated a preferred embodiment of my elapsed time recorder, and in said drawings:

Fig. 1 is a view in elevation of the machine looking from the left side, with the side frame of the machine removed, as indicated by line 1—1 of Fig. 4;

Fig. 7 is a vertical section taken on line 7—7 of Fig. 11 showing the ratchet advancing mechanism for the hour wheels;

Fig. 8 is a vertical section taken on line 8—8 of Fig. 12 showing the gearing for the time indicator and the printing hammer and actuating mechanism;

Fig. 9 is a central vertical section through the time wheels and their two concentric supporting shafts;

Fig. 10 is a series of sectional views of Fig. 9 showing the outlines of the time wheels;

Fig. 11 is a plan view of the time wheels, the timing motor and driving mechanism, and the time indicator;

Fig. 12 is a vertical section taken on broken line 12—12 of Fig. 11;

Fig. 13 is a vertical section taken on broken line 13—13 of Fig. 12 showing the ratchet advancing mechanism for the minute wheels; also one of the corner punching mechanisms;

Fig. 14 is a vertical section taken on line 14—14 of Fig. 11 showing a typical punch operating mechanism and the one-minute time wheel (card at second insertion position);

Fig. 14a is a view similar to Fig. 14 with a different card at second insertion position;

Fig. 14b is like Fig. 14a but with the time wheel in a different position;

Fig. 15 is a vertical section taken on line 15—15 of Fig. 11 showing the locking pawl for the minute wheels;

Fig. 16 is a similar section taken on line 16—16 of Fig. 11 showing the locking pawl for the hour wheels;

Fig. 17 is a vertical section taken on line 17—17 of Fig. 11 also showing the punch operating mechanism and the one-minute time wheel and, in addition, a selective transmission of the computing mechanism; also showing a card at the first insertion position;

Fig. 17a is a view similar to the upper part of Fig. 17 with the time wheel and punch in different positions;

Fig. 18 is a horizontal section taken on broken line 18—18 of Fig. 17;

Fig. 19 is a view of a card as it appears after the first insertion;

Fig. 20 is a view similar to Fig. 17 with the parts in different positions and the card at the second insertion position;

Fig. 21 is a horizontal section taken on line 21—21 of Fig. 20;

Fig. 22 is a detail section taken on line 22—22 of Fig. 20;

Fig. 23 is a view of the card as it appears after the second insertion;

Fig. 24 is a diagrammatic view of the differential gearing of the computing mechanism;

Fig. 25 is a diagrammatic perspective view of the drive from the main driving motor to the Geneva cycling gears and to the Plus and Minus common drive shafts for the computing mechanism;

Fig. 26 is a diagrammatic view of the gear train between the cycling gears and the Plus and Minus common drive shafts for the computing mechanism;

Fig. 27 is a diagrammatic view showing the drive of the plus and minus driving gears of the one-minute selective transmission of the computing mechanism from the common Plus and Minus drive shafts and the connection from the output gear of this transmission to the first minute differential gear;

Fig. 28 is a diagrammatic view of the gear train between the driving belt from the main driving motor and the cycling gears, and from the cycling gears to the punch operating cam and sensor operating cam;

Fig. 29 is a vertical section taken on line 29—29 of Figs. 5 and 31 showing the gear train illustrated diagrammatically in Fig. 25;

Fig. 30 is a vertical section taken on broken line 30—30 of Fig. 29;

Fig. 31 is a horizontal section taken on broken line 31—31 of Fig. 29 and also of Fig. 1;

Fig. 32 is a detail section taken on line 32—32 of Fig. 29;

Fig. 33 is a chart of the cycling mechanism during the computing part of a cycle;

Fig. 34 is a similar chart during the decomputing part of the cycle;

Fig. 35 is a side view of one of the locking discs of the Geneva gear forming part of the cycling mechanism;

Fig. 36 is a side view of one of the mutilated gears also forming part of the Geneva gear above referred to;

Fig. 37 is a sectional view taken on angular broken line 37—37 of Fig. 29;

Fig. 38 is a view in side elevation of the first differential gear of the computing mechanism looking in the direction of the arrows 38—38 of Fig. 5 and showing the connection of this mechanism with the selective transmission for the one-minute time wheel;

Fig. 39 is a view in elevation looking from the right of Fig. 38, the differential being indicated conventionally;

Fig. 40 is in part an enlarged side elevation somewhat similar to Fig. 38 but showing the connection of the first minute differential with the second minute differential, and in part a vertical section taken on broken line 40—40 from Fig. 41;

Fig. 41 is a vertical sectional view taken on broken line 41—41 of Fig. 40;

Fig. 42 is a detailed plan view of the first minute differential mechanism shown conventionally in Figs. 28–41;

Fig. 43 is a vertical section of the differential mechanism taken on broken line 43—43 of Fig. 44;

Fig. 44 is a section taken at right angles to the plane of Fig. 43 on broken line 44—44 of Fig. 43;

Figure 2:
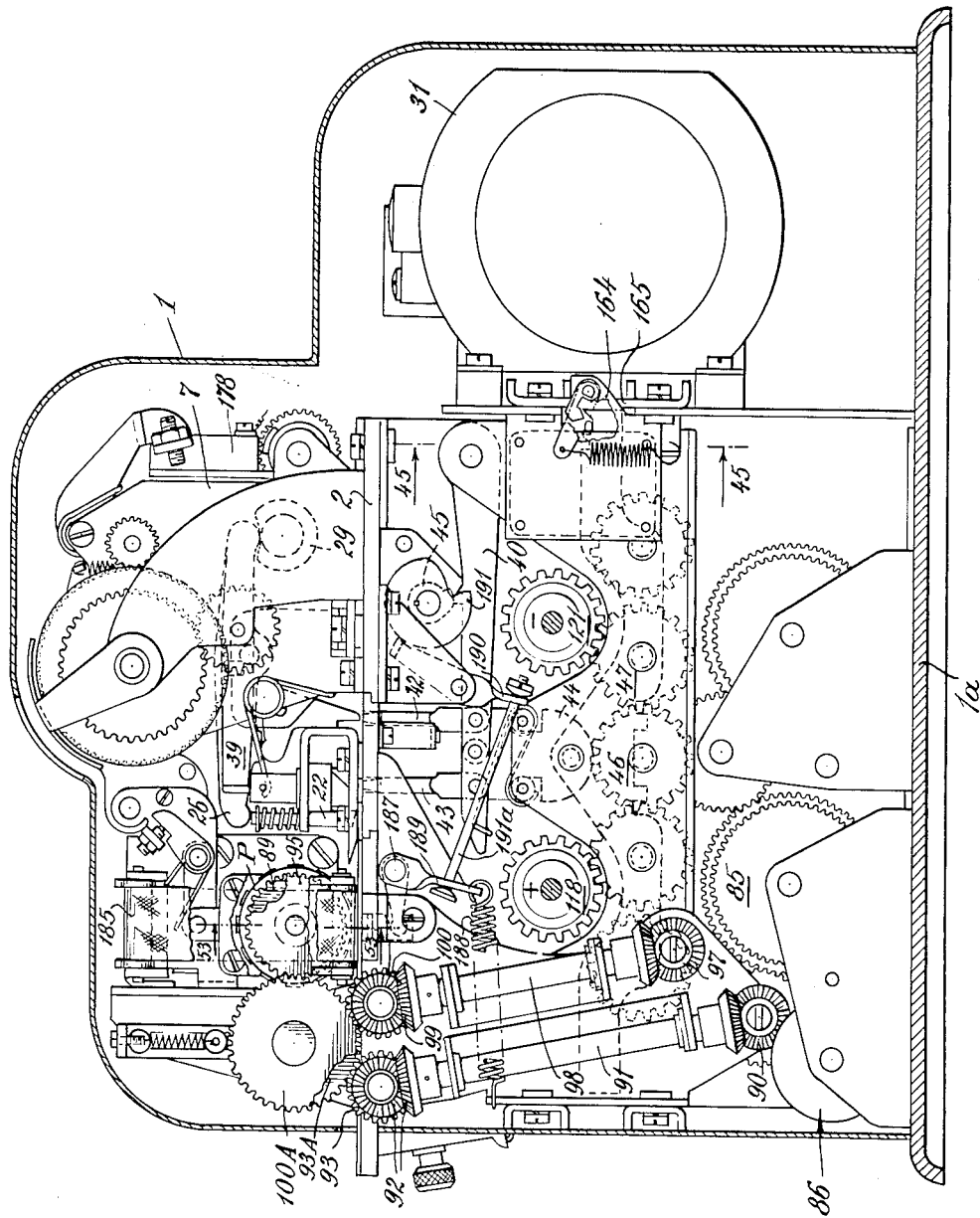
Fig. 2 is a similar view looking from the right side, also with the side frame removed, as indicated by line 2—2 of Fig. 4.

Figs. 45 and 46 illustrate the shifter locking mechanism for the selective transmissions of the computing mechanism, Fig. 45 being a vertical section taken on broken line 45—45 of Fig. 46, and also of Fig. 2, and Fig. 46 being a horizontal section taken on line 46—46 of Fig. 47 and also showing parts of Fig. 45 in plan view;

Fig. 47 is an enlarged end view in the direction of the arrows 47—47 of Fig. 45 showing the mechanism for operating the shifter lock;

Fig. 48 is a vertical section taken on line 48—48 of Fig. 45;

Fig. 49 is a vertical section taken on line 49—49 of Fig. 46;

Fig. 50 is an enlarged view in rear elevation taken on line 50—50 of Fig. 1 showing the stopping switch ending the cycle of operation;

Fig. 51 is a vertical section taken on broken line 51—51 of Fig. 50;

Fig. 52 is a wiring diagram of the electric circuits of the machine;

Fig. 53 is a view of the counter or printing mechanism in vertical longitudinal section taken on line 53—53 of Fig. 2;

Fig. 54 is a view in vertical transverse section taken on line 54—54 of Fig. 53;

Fig. 55 is a similar section taken on line 55—55 of Fig. 53;

Fig. 56 is a similar section taken on line 56—56 of Fig. 53;

Fig. 57 is a similar section taken on line 57—57 of Fig. 53;

Fig. 58 is a similar section taken on line 58—58 of Fig. 53;

Fig. 59 is a longitudinal sectional view of the hour printing mechanism shown in Fig. 53, but the section is taken on the angular broken line 59—59 of Fig. 58;

Fig. 60 is a side view of a lock disc of a Geneva gear (see line 60—60 of Fig. 59);

Fig. 61 is a similar view of the companion gear member of the Geneva gear (see line 61—61 of Fig. 59);

Fig. 62 is a similar view of another Geneva lock disc (see line 62—62 of Fig. 59);

Fig. 63 is a similar view of its companion gear member (see line 63—63 of Fig. 59);

Fig. 64 is a perspective view of a Geneva pinion;

Figs. 65 and 66 are developed views showing the characters on the minute (fractions of an hour) wheels;

Fig. 67 is a view in vertical transverse section taken on line 67—67 of Fig. 53 showing a part of the day wheel mechanism;

Fig. 68 is a similar view taken on line 68—68 of Fig. 53;

Fig. 69 is a sectional view taken on line 69—69 of Figs. 11 and 53, showing the mechanism for actuating the day wheel mechanism;

Fig. 70 is a diagrammatic, exploded view of the hour wheels and their operating mechanism; and Figs. 71 and 72 are side views of two intermittent gears of the hour wheel mechanism.

The machine is completely enclosed by a sheet metal casing 1 and base 1a (Figs. 1–5), and the interior of the casing is divided by a horizontal partition or plate 2 which forms a support for some of the mechanisms. The mechanism on the upper side of this partition consists chiefly of a time controlled perforating mechanism for perforating the card according to a predetermined code. This includes a synchronous electric clock motor, punches, punch-actuating mechanism and punch selector cams, or wheels, which are driven by the clock motor whereby the punches will be selected to punch holes of the proper number and arrangement to indicate the time of day at the time the card is inserted. The printing wheels, the inked ribbon and ribbon drive are also located above the partition. The card 3 (see Figs. 1 only) is placed on top of plate 2 and its inner margin is slid into a slot-like receiver 2a beneath the punches.

The portion of the casing below the partition 2 contains the driving motor and the computing mechanism which serves to turn the printing wheels at each operation from "Zero" position to a position to print the time of day when the card is inserted for the first time, to thereby record the time the work is begun, and to turn the printing wheels, on the second operation, to print the time which has elapsed between the time recorded on the first insertion of the card and the time of day at the time of the second insertion.

The driving, or cycling, motor operates the computing mechanism, the punches, and all parts of the machine except the time wheels, that set the punch-actuating mechanism, which time wheels are continuously driven by the synchronous clock motor. The driving motor is automatically controlled to operate the machine through a complete cycle at each insertion of a card.

In Fig. 19 we have illustrated a card 3 which has been punched and printed at the beginning of a job, and in Fig. 23 we have shown the same card as punched and printed at the completion of the job, showing the elapsed time between the two insertions of the card in the machine. In each of Figs. 19 and 23, just above the cards, is shown the value in hours and minutes (sixtieths of an hour) assigned to the respective punches and the holes formed thereby at the eleven punch locations, these values increasing in geometric progression with a factor of 2. It will be noted in Fig. 19 that the card is notched at its upper corners. These notches are cut upon the first insertion of the card, and at the same time the row of holes (Fig. 19) corresponding to the time of day, in hours and minutes, is punched in the card, and, also, the time of day printed on the card in hours and hundredths of an hour.

On the next insertion of the card the cutaway portions of the card at the corners permit the card to be inserted a greater distance so that the same punches will punch a second row of holes (Fig. 23). This second row of holes also indicates the time of day in hours and minutes, but the legend printed on the second insertion is not the time of day, but the time which has elapsed since the first insertion of the card. In Figs. 19 and 23 the time of day at the first insertion, according to the code of holes, is 9 hours and 12 minutes (9:12 A. M.), and the time printed is 9.20 hours, or nine and twenty-hundredths hours, $\frac{2}{10}$ of an hour equaling 12 minutes. The time of day at the second insertion is, according to the hole code, 19 hours and 18 minutes, or 18 minutes after 7:00 P. M. The elapsed time printed is 10 and $\frac{10}{100}$ hours.

The punch selecting mechanism

This mechanism comprises a synchronous electric motor 4 such as used for operating clocks, time switches and the like. This motor, through a suitable reduction gear and ratchet drive, operates the shaft 5 (Figs. 12 and 13) at a speed of one revolution per hour in one minute steps. This shaft extends across the top of the machine from the bracket 6 which supports the motor 4 and is supported at its other end by a bracket 7. Between the two brackets the shaft carries a number of punch-selecting cams or time wheels of a configuration and arrangement shown in Figs. 9 and 10 of the drawings. There are six minute wheels lettered $a$, $b$, $c$, $d$, $e$ and $f$ and five hour wheels lettered $g$, $h$, $i$, $k$ and $l$. Each wheel consists of two parallel discs spaced apart and having identical teeth or projections on their peripheries.

The wheel $a$ has 30 teeth. The wheel $b$ has 15 teeth. The wheel $c$ has seven projections. The wheel $d$ has four projections. The wheel $e$ has two projections, while the wheel $f$ is cut away through somewhat more than one-half its circumference. The spaces between the teeth or projections vary somewhat for reasons which will be mentioned later, but for wheels $a$ and $b$, are the same as the width of the teeth. All the minute wheels above described are attached to the shaft 5, and all the hours wheels are attached to a sleeve 8 mounted on the shaft 5, as shown in Fig. 9, which sleeve is driven from the shaft 5 through a suitable ratchet drive, to be described, and makes one revolution every 24 hours.

The shaft 5 is driven intermittently from the motor 4 through the ratchet mechanism shown in Fig. 13, to be described, which advances the shaft $\frac{1}{60}$ of a revolution at each movement so that at each operation of the ratchet mechanism, wheel $a$, will turn from a position wherein one of its notches is coincident with the vertical diameter of the wheel to a position where the adjacent tooth lies coincident with the vertical diameter. Thus for each 60th of an hour a tooth on wheel $a$ is in operative position coincident with the vertical diameter of the wheel, and for the next interval of $\frac{1}{60}$ of an hour a notch is at the operative position. The wheel $b$ has 15 teeth and 15 notches, so that each tooth will be in operative position for two intervals of $\frac{1}{60}$ of an hour and the adjacent notch will be active for the succeeding two intervals of $\frac{1}{60}$ of an hour. In the same way the projections and intervening spaces of the wheels $c$, $d$, $e$ and $f$, will be alternately effective for intervals determined by their circumferential length. The minute wheels $a$ to $f$, as illustrated in Figs. 9 and 10, are effective to select the punches which punch the holes in the cards representing the minutes of the time of day.

There is a punch and punch operating mechanism for each of the punch-selector cams or wheels $a$ to $l$. Each punch operates when the lowermost projection on the wheel which controls it extends across the vertical diameter of the wheel, and is inoperative during the periods that the spaces between the projections are in this position. Thus in Fig. 20 the wheel $a$ is in position to effect the operation of its punch because the lowermost tooth overlies the fulcrum of the punch operating lever, while in Fig. 17 the wheel *a* is shown in position to prevent operation of its punch.

Figure 6:
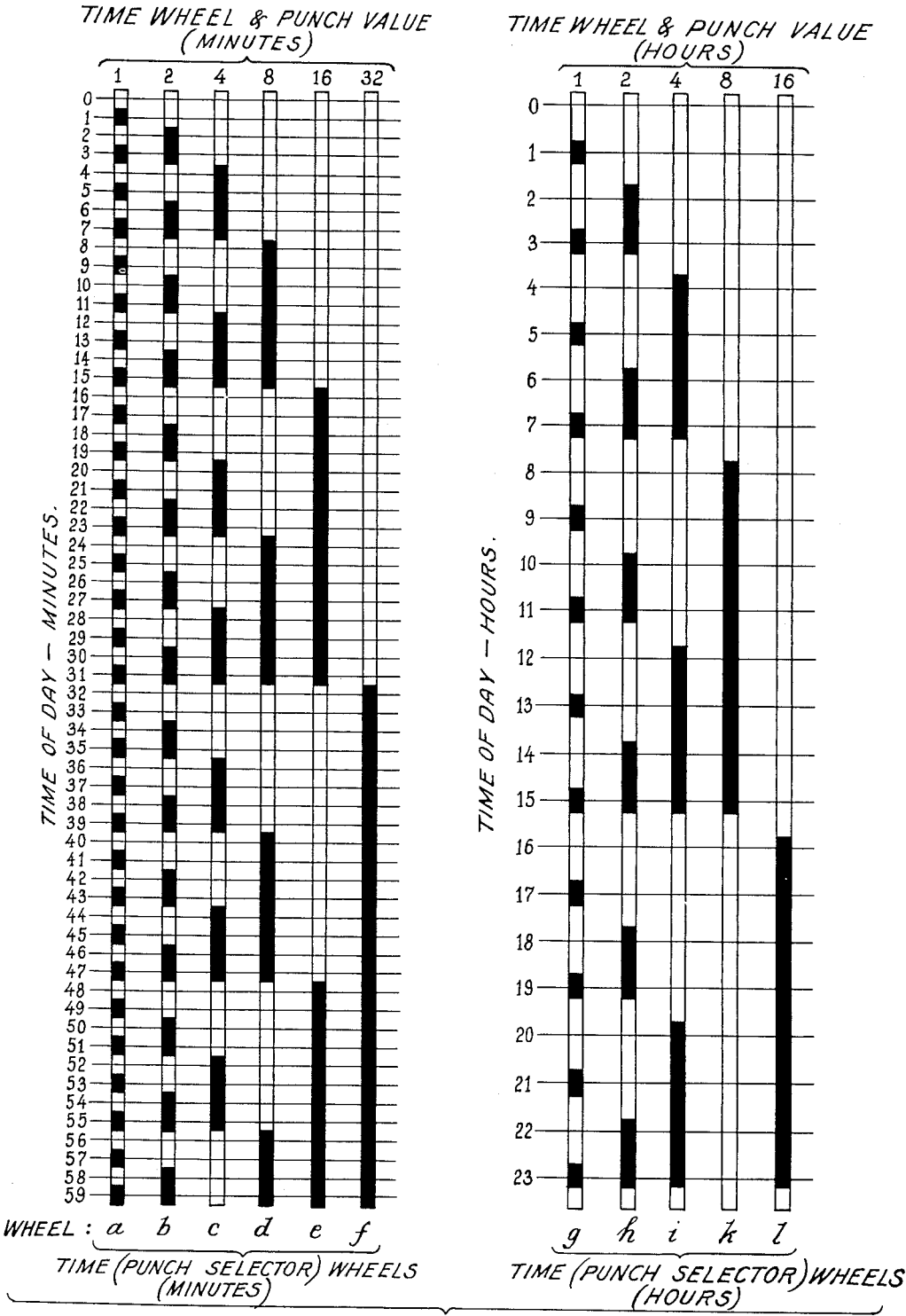
Fig. 6 is a diagram representing the planar development of the time wheels or cams.

In Fig. 6 the relative positions and dimensions of the projections on the wheels *a* to *f* and *g* to *l* are illustrated as they would appear if formed on continuous racks instead of wheels. The projections are shaded and the spaces are unshaded. The light horizontal lines numbered 1 to 60 represent the sixty positions at which the minute wheels *a* to *f* stop during one complete rotation of the shaft 5. Where these lines cross the shaded portions of the racks representing the wheels *a* to *f*, the punch controlled by that wheel will be operated, but it will not be operated at those intervals where the lines cross the unshaded portions.

It will be noted that at line "1," which represents the positions of the several wheels at the first step advance of the shaft 5 at the beginning of an hour, only the punch controlled by the wheel *a* will be operated, the hole thus punched indicating one minute past the hour. At the next position of the wheels, indicated by line "2" it will be noted that the only shaded portion of any of the racks representing the wheels *a* to *f* which is intersected by the line 2 is on the wheel *b*, so at this position the only punch operated is the one controlled by the wheel *b*, thus indicating two minutes past the hour.

At the next time wheel position the punches controlled by both the wheels *a* and *b* will be operated, indicating three minutes past the hour. At each successive position, as indicated by the lines 1 to 60, a different combination of punches will be operated. For example, at line 37, the punch controlled by wheel *f*, representing thirty-two minutes past the hour, together with the punches controlled by the wheels *a* and *c*, representing 1 and 4 minutes, respectively, will be operated.

The hour wheels *g*, *h*, *i*, *k* and *l* (Figs. 9 and 10) operate in the same manner as the minute wheels to select the proper punches for indicating the hour of the day the card is inserted. Sleeve 8, surrounding the right half of shaft 5 and carrying the hour wheels, as stated above, is driven from the shaft 5 by means of a ratchet drive (Fig. 7), to be later described, which advances the sleeve 1/24 of a revolution for each revolution of the shaft 5. The wheel *g* is the one-hour wheel and as shown has twelve teeth with twelve intervening notches, each tooth representing one hour of the day. Wheel *h* is the two-hour wheel with six teeth and six notches, each tooth representing a two-hour interval. Wheel *i* is the four-hour wheel with three projections and three intervening cutaway portions, each projection of which represents a four-hour interval. Wheels *k* and *l* are respectively the 8 and 16 hour wheels, and each has a portion of its circumference cutaway through substantially two-thirds the total circumference, leaving a portion of a maximum radius of substantially one-third the total perimeter of the wheel. These two wheels are attached to the sleeve 8 in staggered relation so that their raised portion will successively come into action to render the associated punches operative.

In Fig. 6 we have shown the hour wheels diagrammatically as racks with the same arrangement and dimensions of projections and spaces as make up the peripheries of the several wheels. Lines 1–24 extending across these racks indicate by the shaded portions intercepted by each line just which punches will be operated to indicate each particular hour of the twenty-four. Thus for the thirteenth hour, wheel *k*, which represents 8 hours, the four-hour wheel *i* and the one-hour wheel *g*, will cause their respective punches to be operated, the total of the punched holes representing thirteen hours from midnight or one P. M.

The ratchet drive for operating the shaft 5 to which the minute wheels are attached is shown in Figs. 3, 11, 12 and 13. This mechanism comprises a short shaft 9 driven from the clock motor 4 at a speed of one revolution per minute. Shaft 9 is in line with and terminates adjacent the end of the shaft 5 and carries a spiral cam 10 (Fig. 13), which cam at each revolution of shaft 9 serves to gradually raise the cam follower 11 and let it drop abruptly when the high point of the spiral passes from beneath the follower. The cam follower 11 is attached to the side of a pivoted curved arm 12 whose free end carries a pivoted pawl 13 engaging the teeth of a ratchet 14 attached to the end of the shaft 5. A locking pawl 15 holds the shaft against reverse operation. The ratchet 14 has sixty teeth, and the cam 10 lifts the pawl 13 a distance such that at each movement it moves the ratchet a distance of one tooth.

Figure 3:
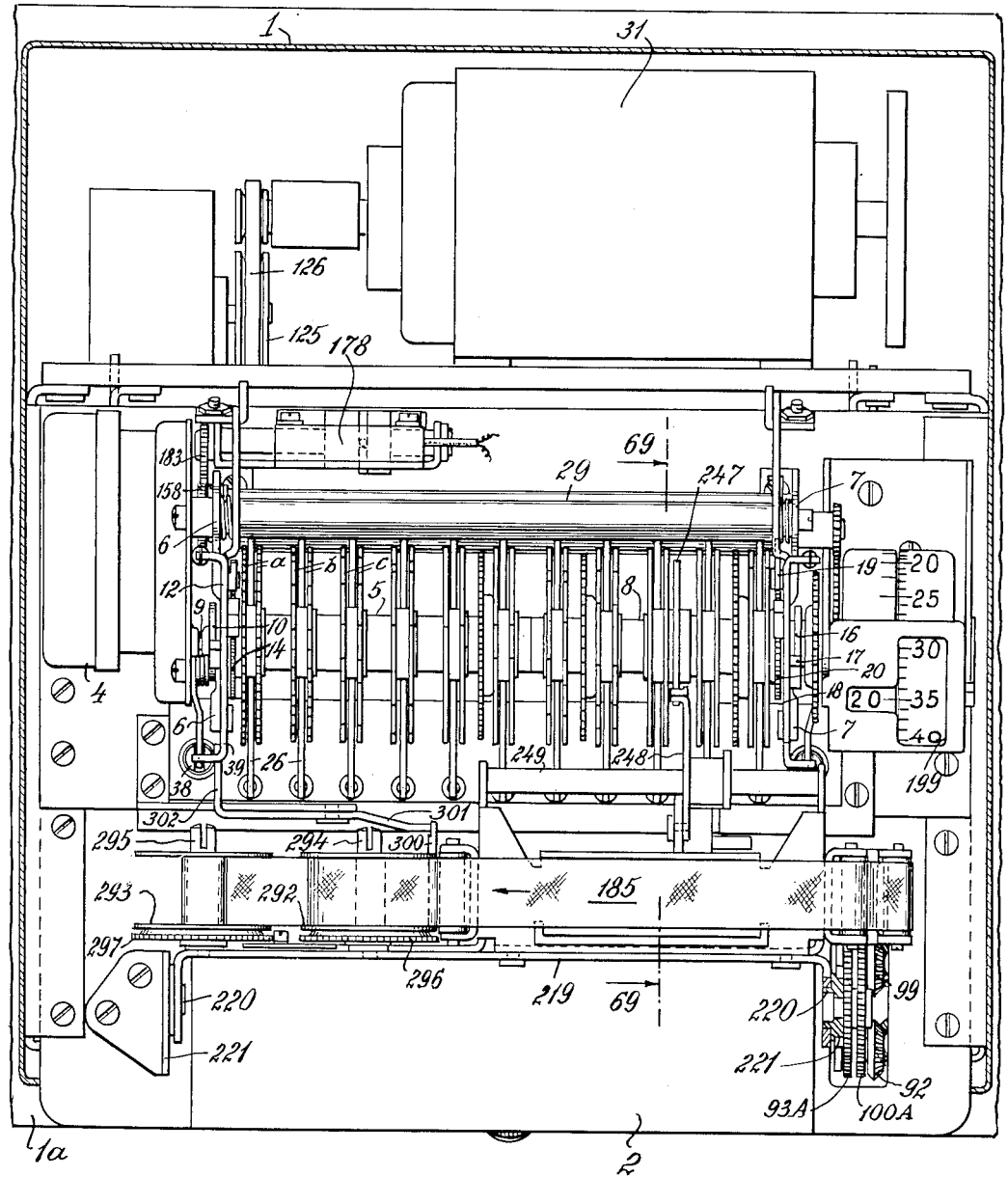
Fig. 3 is a plan view of the machine with the casing removed.

A similar mechanism is employed for driving the sleeve 8 from the shaft 5. This mechanism is shown in Fig. 7 and consists of a spiral cam 16 mounted on the opposite end of the shaft 5 (Fig. 3). The periphery of this cam is engaged by a follower 17 carried by a pivoted curved arm 18 attached to the supporting bracket 7 for the bearing of the shaft 5. The arm 18 carries at its free end a pawl 19 which engages the teeth of a ratchet 20 attached to the adjacent end of the sleeve 8. The ratchet 20 has twenty-four teeth and consequently for each revolution of the shaft 5 the sleeve 8 will be advanced 1/24 of a revolution. A locking pawl 21 holds the sleeve 8 and the attached hour wheels against reverse rotation.

*The punch operating mechanism*

The punch operating mechanism is shown in detail in Fig. 17 in conjunction with the time wheel or punch-selecting wheel *a*. This punch mechanism comprises a punch 22 and a die plate 23 having a hole underlying the punch, and over which the card is positioned when pushed into the machine by the user. The punch is mounted in a supporting bracket 24 whose lower portion also serves to hold the card in position to be punched. The punch is held in elevated position by a spring 25 and is actuated by a lever 26 which is mounted between a pair of brackets 27 that are notched at their upper edges to receive the fulcrum pin 28 of the lever. The lever is supported at one end on a punch cam 29 and at the other end on the upper end of the punch. The fulcrum pin 28 and the brackets 27 hold the lever against lateral displacement. Lever 26 at a point intermediate the fulcrum pin and the punch 22 actuates a pivoted sensor stop member 30 which is spring-biased against the lower edge of the punch lever. The function of this will appear presently. The punch levers 26 lie between the two discs making up each of the time wheels *a* to *l*, inclusive.

As stated above, the time wheel *a* is advanced the width of one tooth or space each 1/60 of an hour by the ratchet drive shown in Fig. 13. In Fig. 17 the wheel *a* is shown in position with a notch overlying the fulcrum pin 28. When the wheel is so positioned the punch will not be operated by the punch cam 29. When the punch cam is turned the lever will be elevated at the end resting on the punch cam, the notch in the wheel *a* permitting this upward movement of the fulcrum pin 28. When, however, the wheel *a* is in a position such that its tooth overlies the fulcrum pin, as shown in Fig. 20, the operation of the punch cam will cause the lever to turn on the fulcrum pin as an axis, thereby depressing the punch and punching a hole in the card at a point corresponding with the time wheel *a*.

As stated, each of the time wheels *b*, *c*, *d*, *e* and *f* has associated with it punches and punch operating levers, dogs, etc. similar to the parts associated with the wheel *a*, as illustrated in Figs. 17 and 20, and hence holes will be punched in the card by such punches as have, at the instant the card is inserted, one of the projections on the periphery of the wheel overlying the fulcrum of its lever, while the punches controlled by those time wheels so positioned that the spaces between the projections overly the punch lever fulcrums will not be operated.

In the drawings we have illustrated in detail only one punch and associated mechanism but, as will be seen in Figs. 11 and 12, there are for each of the time wheels *a* to *l*, a similar punch mechanism, so that holes will be punched in the cards at one or more of the locations of the several punches, the combination of holes being different for each minute and for each hour of the twenty-four hours.

The punch cam 29 is driven from the driving, or cycling, motor 31, in the lower portion of the casing, as previously stated, which operates all parts of the machine except the time shaft 5 and the parts driven therefrom. The drive is through suitable gearing shown diagrammatically in Figs. 25 and 28 and which will be later described. Punch cam 29 makes one revolution at each insertion of the card into the machine. Punch cam 29 consists of a single round shaft extending parallel with the shaft 5 (Figs. 3 and 14) and with one side of the cam shaft recessed as shown to normally provide a seat for the rear ends of the punch-operating levers 26 while the shaft is not in rotation. The shaft makes one complete revolution at each cycle and always stops in position with the recessed side uppermost to support the punch levers, as shown.

The control circuit of the motor 31 includes two starting switches 32 and 32', one of which is shown in Fig. 7 and whose operation will be described. This switch is closed by one corner of the card and it is thrust into the machine. The movable part of switch 32 is held out of contact with the stationary terminal by a lever 33 fulcrumed on the underside of the partition 2 which separates the upper and lower parts of the casing. Switch 32 is shown diagrammatically in Fig. 7, i. e., swung horizontally 90° from its actual position. The lever 33 is spring-biased in a direction to close the switch by a spring 34 carried by a pin 35 connected to the opposite end of the lever from the switch 32, the pin in turn being supported for vertical movement in a bracket attached to the underside of the partition.

The upper end of the pin presses against a shiftable plate 36 which is spring-biased toward the front of the machine and is positioned adjacent the guide for the end of the card to be punched so that the plate 36 will be engaged by the corner of the card when it is thrust into the machine. Plate 36 will be pushed back by the card a sufficient distance for a hole 37 in the plate to overlie pin 35, thus permitting the lever 33 to turn on its pivot, releasing the movable switch member and closing the switch 32 which starts the main driving motor 31 to begin a cycle of operation of the machine. The cutter and switch mechanism is duplicated for the opposite end of the card so as to cut off both corners and to insure that the card is fully in position before starting motor 31. (See circuit diagram, Fig. 52.)

The punch operating cam 29 is driven from driving motor 31 by suitable gearing, to be later described, which effects a single revolution of the shaft for each card insertion, and the punches whose operating levers underlie projections on the associated time wheels will be actuated to punch holes in the underlying card. At the same time the corners of the card engaging the slides 36 will be cut off by the cutters 38, one of which is shown in Fig. 7. Each cutter consists of a square knife or punch 38 mounted in a bracket 39 similar to the bracket supporting the various punches 22 and is pressed downwardly by a cutter-operating lever 39 actuated by punch cam 29 and pivoted on the adjacent brackets 6 and 7 respectively.

Each of the two corner punches 38 is provided with a notch in order to form a cam surface 38*a* (Fig. 7) which will, under the circumstances mentioned below, engage the forward end of plate 36 in such a way as to force this plate backwards as the punch descends. Plates 36 may have an upward tongue 36*a* to provide a surface for engagement with cam 38*a* when the punch is in its extreme upward position. This will prevent breakage of plates 36 should punches 38 accidentally be operated when a card has not been inserted.

The computing mechanism

Comprising the computing mechanism there are eleven rotary computing members in the form of spur gears (six for the minute time wheels and five for the hours time wheels), operatively connected as shown diagrammatically in Fig. 24, to differential, or epicyclic, gear mechanisms arranged in two trains, together with eleven selective transmissions or connecting mechanisms, which serve to selectively connect the rotary computing members with a cycling driving mechanism (Fig. 25, diagrammatic) which operates the computing mechanism. Each of the selective transmissions is under the control of a sensing mechanism associated with one of the eleven punch selecting mechanisms, previously described, each of these selective mechanisms controlling one of the rotary computing members, and determining not only which of the eleven rotary computing members shall be operated, but also in which direction it shall be turned, by the cycling mechanism. One of the trains consists of the five differential mechanisms which compute the minutes in hundredths of an hour, and their rotary computing members are controlled by the six minute punch-selecting cams, or time wheels, *a–f*. The other train consists of the four differential mechanisms which compute the hours, and their rotary computing members are controlled by the time wheels *g–l*.

The two final differential mechanisms of these two trains are operatively interconnected, by means of a Geneva gear (Fig. 24) and a mixing or carryover differential mechanism, to carry over full hours from the hundredths of an hour train to the hour train. The final output members of the two trains of differential mechanisms serve to turn the hundredths of an hour and hour printing wheels 88, 88*a* and 94, 94*a*, respectively.

The selective connecting mechanism for impressing upon the computing mechanism the starting time as indicated by the row of holes punched in the card on the first insertion of the card, and the finishing time (indicated by the holes punched in the card on the second insertion) is shown in Figs. 17–21. The second row of holes indicates the finishing time, but these holes themselves do not cooperate with the sensing mechanism. They are, however, indirectly sensed as will be presently described.

The sensing mechanism comprises a sensing lever 40 for each punch. These levers are pivoted to a fixed portion of the frame beneath the partition 2, upon which the time-controlled devices are mounted, and are spring-biased upwardly by individual springs 41. Each lever 40 is substantially parallel with the overlying punch lever 26, and attached to each lever 40 are two sensor fingers or pins 42, 43 marked Plus and Minus, respectively, in Figs. 17 and 20.

The fingers are attached to the levers by means of rocking or tilting control plates 44 pivoted to the levers at points midway between the pivots of the pins, which in turn are pivoted to the plates. The fingers 42, 43 project upwardly from the levers 40 through holes in the die plate 23 immediately back of the holes underlying the punches 22. During the sensing operation levers 40 raise the fingers, which are guided in paths determined by these holes.

Each negative sensor finger 43 is so positioned with respect to the adjacent punch that upon reinsertion of the card it will register with the holes punched in the card at the first insertion of the card. That is to say, the distance between the fingers 43 and the punches 22 is equal to the width of the piece of card removed from the corners of the card by the cutters 38. The finger 42 is positioned to the rear of finger 43 a sufficient distance to be clear of the edge of the card upon the second insertion.

Overlying each of the positive sensor fingers 42 is the end of the downwardly extending arm of the pivoted sensor stop member 30 whose upper arm is engaged by the overlying punch lever 26, as above described. The arrangement is such that upon the operation of the lever in punching the holes in the card, the pivoted stop 30 will be turned on its pivot out of the path of sensor finger 42 to the position shown in Fig. 20, thereby permitting the finger 42 to move upwardly if the parts are positioned for the corresponding punch to be operated (Figs. 17a and 20). Thus each punch 22 is, through the cooperation of its corresponding sensor finger 42 and pivoted sensor stop member 30, enabled to sense it own operation according to whether or not a perforation is being made in the card, either at the first insertion in the card receiver, or at reinsertion. In this way the holes punched in the card at the second insertion are indirectly sensed, while those previously punched are directly sensed (by fingers 43).

The movement of sensing levers 40 is caused by a sensor cam 45 (Figs. 17 and 20) which extends across the machine over all the levers 40 (Fig. 12) and is rotated in synchronism with the punch-operating cam 29 (Fig. 27) to make one revolution upon each insertion of a card. The single lobe of the sensor cam 45 is so timed with respect to the punch-operating mechanism that during that part of the cycle when the punch levers 26 are being rocked as shown in Fig. 20, the sensing levers 40 may be elevated by their respective springs 41, provided upward movement of one or both sensor pins 42 and 43 is permitted (in one case by the shifting of pivoted sensor stop 30, and in the other by the presence of a previously punched hole in the card).

It will be understood that movement of the sensor pins 42 will or will not be permitted depending upon the positions of their overlying time wheels as determined by the time of day when the card is inserted in the machine. If the fulcrum 28 of punch lever 26 corresponding with a particular sensing lever 40 is held down by a projection on the overlying time wheel, the punch will be operated, and the pivoted stop 30 will be shifted to permit upward movement of finger 42. Such a condition is illustrated in Fig. 20. The sensor cam 45 has released lever 40, and its spring 41 has lifted this lever. The finger 42 is not obstructed by the pivoted stop 30 but the finger 43 is held down by an imperforate portion of the overlying card, with the result that the tilting plate 44 upon which the pins 42 and 43 are mounted is swung to the left, as shown in Fig. 20, which movement has the effect of bringing into operation the portion of the computing mechanism controlled by that particular punch.

The mechanism shown in Figs. 17–20 is that controlled by the one-minute wheel a, and the effect of tilting the member 44 to the left, as shown in Fig. 20, is to turn the minute type wheels 83, 83A (Fig. 24) an angular distance corresponding to 1/60 of an hour. This movement is accomplished by the arrangement of parts illustrated in Figs. 17 and 20 (together with the differential mechanisms of Fig. 24), which parts are duplicated for each of the minute and hour wheels a–l inclusive (Fig. 12). These parts include two driving gears 46 and 47 (Figs. 20 and 21) which are rotated through one complete cycle (four revolutions) upon each insertion of the card. These gears are normally not in driving engagement with the parts of the computing mechanism driven therefrom, but all the gears 46 and 47 are at each operation of the machine turned through one complete four revolution cycle by the cycling mechanism to be later described.

When the tilting member 44 carrying the sensor fingers 42 and 43 is tilted to the left, as shown in Fig. 20, gear 46 is connected to the first differential of the computing mechanism by means of a wide connecting gear 48 which, as shown in Fig. 21, is twice the width of gear 46 and thereby serves to transmit the motion of gear 46 to an idling pinion 49 which is mounted contiguous to and on the same stud as the gear 46. Pinion 49 is in constant mesh with the output gear or rotary computing member 50a which through pinion 51a, turns the first differential mechanism. That is to say, the timing of the movement of the several parts by the cycling mechanism is such that the four revolutions imparted to the gear 46 commence after the sensor cam 45 has released the sensing levers 40 and after the punch lever 26 has operated to shift or not, as the case may be, pivoted sensor stop 30.

The arrangement of parts shown in Figs. 17, 18, 20 and 21 may be regarded as a selective connecting or transmission mechanism between one or the other of the two oppositely rotating cycling driving gears 46 and 47 and the computing gear 50a, which may be considered as a rotary computing member, and it will be understood that there is one of these selective transmissions for each of the eleven punch-selector cams or time wheels a to l, inclusive. The output gears or rotary computing members of these respective transmissions are numbered 50a–50l, inclusive (Fig. 24).

When the card is inserted the second time and a previously punched hole in the card overlies a sensor finger 43 (Fig. 14a) and pivoted sensor stop 30 is not shifted by punch lever 26 to release the finger 42, as is the case if the time wheel is in a position to prevent the punch from operating, the tilting control member 44 will be tilted to the right of its normal vertical position and will hereby cause computing member or gear 50a to be driven in the reverse or negative direction a distance corresponding to four complete revolutions of the gear 47. This driving engagement is accomplished by a connecting gear 52, similar to the gear 48, which is shifted with the gear 48 to establish driving connections between the gear 47 and a coaxial idling pinion 53 which constantly meshes with computing gear 50a on the opposite side from pinion 49.

All of the gears above described except the connecting gears 48 and 52 are carried by shafts mounted on a stationary frame. The gears 48 and 52 are, however, supported by a shifter bar 54 supported in brackets 55 for limited movement in a direction transverse to the axis of rotation of the several gears. Shifter bar 54 is actuated by tilting control member 44 and is provided at the mid-portion of its upper edge with a pin 56 which extends into a slot in the lower edge of the tilting member 44. Thus, when control member 44 is tilted to the left, as shown in Fig. 20, driving connection is established between the gear 46, that is, the so-called Plus driving gear, and the computing gear 50a, and when control member 44 is tilted in the opposie direction driving connection for gear 50a is established with the Minus driving gear 47.

When the Plus sensor pin 42 is held down by the pivoted stop 30 and the Minus finger 43 is held down by the overlying unpunched card (Figs. 14 and 17), the sensing lever 40 does not move when released by the sensor cam 45, and, consequently, computing gear 50a is not operated in either direction. The driving gears 46 and 47 complete their respective revolutions without imparting any movement to this particular section of the computing mechanism. Also, when the sensing finger 42 is released by the pivoted sensor stop 30 and sensing finger 43 is released by a registering hole in the overlying card (Fig. 14b), the lever 40 will move upward when released by the sensor cam 45 but will not tilt control member 44, so that in this condition also there will be no movement imparted to the computing mechanism.

In order to insure that tilting member 44 is held in vertical position (without tilt in either direction) when the sensing lever 40 is raised or lowered under the two conditions mentioned in the previous paragraph, two leveling pins 57 (Figs. 14 and 17) are mounted in fixed horizontal position and project into two slots on the opposite sides of tilting member 44. The width of these slots limits the stroke of sensing lever 40, the upper sides of the slots contacting pins 57 when sensor cam 45 holds lever 40 down, and the lower sides of these slots contacting these pins when the sensor cam allows lever 40 to rise, member 44 being in upright position. When member 44 tilts either to the left or right (Figs. 14a and 20), the two pins 57 contact with the opposite sides of the slots.

To insure that the teeth of pinions 49 and 53 are held in alignment with those of the shiftable connecting gears 48 and 52, respectively, when shifter bar 54 is shifted to its central or neutral position, so that, on the next movement of shifter 54 either to the right or left, the teeth of gear 48 or 52 will mesh with the teeth of gears 49 or 53 without interference, locking devices for gears 48 and 52 and central computing gear 50a are provided. These locking devices comprise a laterally projecting flange 58 on each of gears 48 and 52, and a somewhat similar flange 59 on output gear 50a. Flanges 58 each have a single opening into which one of two stationary locking fingers 60 is received when shifter 54 is moved in one direction or the other. Since gears 48 and 52, during each operating cycle, are turned through an exact number of revolutions, namely, four, at the end of each cycle the openings in the two flanges 58 will always stop in horizontal alignment with fingers 60.

The locking of central gear 50a is accomplished by providing two aligned openings in the opposite sides of flange 59, into which enter two rearwardly projecting lugs 61 on the shifter 54 when the shifter is moved to the central or neutral position, and out of which they are moved whenever shifter 54 is moved either to the right or left.

It will be understood that there are eleven Plus driving gears 46 and eleven Minus gears 47, one pair for each of the minute and hour wheels *a* to *l* above described. As stated, there are eleven mechanisms or selective transmissions (identical with that above described) for selectively rotating in one direction or the other the eleven output gears or rotary computing members 50a–50l (Fig. 24) of the computing mechanism.

The positions of the eleven time wheels *a–l*, which are rotated by the clock motor 4, determine whether the turning of punch cam 29 shall, or shall not, operate the punches associated with respective time wheels during the cycle of operation which occurs at each insertion of a card. The Plus and Minus sensor fingers 42, 43 and tilting control member 44 of each of the eleven selective transmissions determine whether, and in which direction, their respective rotary computing members 50a–50l, corresponding to the eleven time wheels, shall be rotated during the cycle. This depends on whether the position of the particular time wheel calls for operation of its punch and whether or not the card has in it at that punch location a previously punched hole.

On the first insertion of the card, there are two possible conditions for each of the eleven rotary computing members 50a–50l, as follows:

1. If the position of the particular time wheel does not call for operation of the punch and if there is no hole in the card at that punch location, tilting control plate 44 remains upright and the rotary computing member for that particular time wheel does not turn during the cycle (Fig. 17—shows first insertion).

2. If the position of the particular time wheel does call for operation of the punch and if there is no hole in the card at that location, control member 44 tilts to the left, causing the rotary computing member to turn in the positive direction four revolutions during the cycle (Fig. 17a—shows first insertion).

On the second insertion of the card, there are four possible conditions, as follows:

3. If the position of the particular time wheel does not call for operation of the punch and there is no hole in the card at that location, tilting control member 44 remains upright and the rotary computing member for that particular time wheel does not turn during the cycle (Fig. 14—shows second insertion).

4. If the position of the particular time wheel does not call for operation of the punch and there is a hole in the card at that location, control member 44 tilts to the right, and the rotary computing member turns in the negative direction four revolutions during the cycle (Fig. 14a—shows second insertion).

5. If the position of the particular time wheel does call for operation of the punch and there is a hole in the card at that location, control member 44 remains upright, and the rotary computing member does not turn during the cycle (Fig. 14b—shows second insertion).

6. If the position of the particular time wheel does call for operation of the punch and there is no hole in the card at that location, control member 44 tilts to the left, and the rotary computing member turns in the positive direction four revolutions during the cycle (Fig. 20—shows second insertion).

In Fig. 24 I have illustrated diagrammatically the several differential gear mechanisms for delivering to the printing mechanism the movements of the rotary computing members or gears 50a–50l in such manner that the type wheels will be advanced an angular distance corresponding to the sum of the hours and minutes represented by the holes punched in the card on the second insertion and will, in effect though not actually, be turned backward an angular distance corresponding to the sum of the hours and minutes represented by the holes punched in the card on the first insertion. In this drawing I have illustrated the several differentials in order to show in one figure the entire sequence of operations, but in other figures of the drawings which show the actual machine, the differentials are completely illustrated as of the planetary type. The differential mechanisms in each of the two trains are connected in series which means that the driven gear of one differential mechanism is connected to turn one of the driving gears of the next differential mechanism in the train.

The rotary computing members or gears 50a–50l are referred to hereinafter sometimes by these terms and sometimes as "output gears," which means the output members of the respective selective transmissions (Figs. 17–20).

Referring to Fig. 24, it will be assumed that the rotary computing members or output gears 50a–50l, controlled by the minute wheels *a–f* and the hour wheels *g–l*, are rotated, when connected to the driving gear 46 or 47, one complete revolution in each direction at each operating cycle, that is, at each insertion of a card. However, in the actual machine these gears are rotated four revolutions in each direction of rotation at each cycle, in order to reduce the effect of back-lash. Such rotation in the computing direction moves the printing wheels to printing position. Immediately after printing, rotation in the opposite direction (decomputing) takes place thus returning the printing wheels to Zero.

Computing gear 50a (Fig. 24) controlled by the one-minute wheel *a*, drives through gears 51a and 62a (actually on the same hub), one driving member 63 of a differential gear mechanism 64 in the clockwise direction when gear 50a is driven from the Plus driving gear 46, and in the counterclockwise direction when gear 50a is driven from the Minus driving gear 47. A two-to-one gear reduction is provided between gears 59a and 63. This is diagrammatically indicated in Fig. 24, but is obtained somewhat differently in the actual machine.

Computing gear 50b, controlled by the two-minute wheel *b*, is geared one-to-one to the second driving gear 65 of the differential 64, and serves to transmit motion in the same, or clockwise direction to this second driving gear 65 when gear 50b is driven from the Plus driving gear 46, and in the opposite direction when gear 50b is driven by the Minus driving gear 47. Thus the driven member of differential 64 will be turned through an angular distance corresponding to the sum of the movements imparted to it by the two computing gears 50a and 50b if they are both operated from the Plus driving gear 46, and an angular distance corresponding to the difference between the two if one driving member of differential 64 is operated from Minus driving gear 47 and the other is operated by Plus driving gear 46.

The driven member 66 of the first differential 64 is connected through gears 67 and 68 with one the driving members 69 of a second differential 70 and the other driving member 71 of the differential 70 is driven from a gear 72 which in turn is driven by the gear 50c controlled by the four-minute wheel c. Hence, the driven member 73 of the differential 70 will be operated through an angular distance and in a direction corresponding to the accumulated Plus and Minus movements of the three computing gears 50a, 50b and 50c controlled respectively by the minute wheels a, b and c. In like manner the driven member 73 of the second differential 70 operates one driving member 74 of a third differential 75 whose other driving member 76 is driven from the gear 50d controlled by the eight-minute wheel d.

The output gears 50e and 50f, controlled by the minute wheels e and f, are similarly connected through additional differentials 77 and 78 with the driven member of the differential 75 so that the driven member 79 of the final differential 78 in the train will be advanced an angular distance corresponding to the elapsed time between the minutes represented by the holes punched on the second insertion of the card and the minutes represented by the holes punched at the first insertion.

In like manner the hour output gears 50g–50l operate through a similar series of differentials, marked 80 to 83 inclusive in Fig. 24, to turn the driven member of the final differential 83 an angular distance corresponding to the difference in hours indicated by the holes punched on the second and first insertions.

For example, if the holes punched on the first insertion of the card correspond with minute wheels a, c and d, and hour wheels g and k, representing the sum of 1, 4 and 8, i. e., 13 minutes after the hour of 1 plus 8, i. e., 9 A. M., and the holes punched on the second insertion of the card are those controlled by minute wheels a, b and e, and hour wheels g, h and l, representing the sum of 1, 2 and 16, i. e., 19 minutes after the hour of 1 plus 2 plus 16, i. e., 7 P. M., the driven shaft 79 of the final minute differential 78 will be turned forward through a distance corresponding to 19 minus 13, or $6/60$ of an hour, and will advance the minute printing wheels $1/10$ of an hour. Similarly, the drive shaft 84 of the final hour differential 83 will be turned forward a distance of 19 minus 9, i. e., 10 hours.

The computation of 10 hours and six minutes (or $1/10$ of an hour) is made up of the following individual movements: As holes corresponding to one minute are punched on both insertions of the card, both sensor fingers 42 and 43 controlled by the one-minute wheel a will move upwardly with the lever 40. Hence, the member 44 will not be tilted, and the output gear 50a of the one-minute selective transmission will not be operated in either direction. As the two-minute hole controlled by the time wheel b is punched on the second insertion of the card, the output gear 50b of the two-minute selective transmission will be turned one revolution in a forward or plus direction thereby advancing the driven member 66 of the first differential 64 (Fig. 24) a distance of one-half a revolution, the other driving member 63 of differential 64 being stationary.

The hole at the four-minute location, controlled by time wheel c, was punched on the first insertion of the card but not on the second insertion; hence, the second driving member 71 of differential 70 (Fig. 24) will be turned one revolution in the reverse direction by the four-minute gear 72 (driven by output gear 50c). At the same time the other driving gear 69 of differential 70 is turned in the forward direction one-half a revolution by the driven member 66 of differential 64 so the driven member 73 is turned backward one quarter of a revolution.

The eight-minute hole was also punched only on the first insertion of the card so the driven member of differential 75 is turned backward by both driving members 74 and 76 a total distance of $5/8$ of a revolution. The sixteen minute hole was punched only on the second insertion of the card and consequently the driven member of the differential 77 will be driven forward one-half a revolution by the sixteen-minute output gear 50e and backward $5/16$ of a revolution by the driven member of differential 75, thus giving a net forward movement of $3/16$ of a revolution to the driven member of differential 77.

The gearing between the driven member of the final minute differential 78 and the printing wheels is such that a complete revolution of one of the driving wheels of the differential 78, the other remaining stationary, will advance the printing wheels $32/60$ of an hour. As neither hole was punched at the 32 minute location, only the driver of differential 78 which is driven from the driven member of differential 77 will be turned, and the extent of movement will be $3/16$ of a revolution. This movement will drive the shaft 79 through a distance corresponding to $3/16$ of $32/60$ of an hour or $6/60$ of an hour.

In like manner the output gears 50h and 50l of the two-hour and sixteen-hour selective transmissions, controlled by time wheels h and l respectively, will give forward movements to hour differentials 80 to 83 in Fig. 24, and the 8 hour output gear 50k will effect a backward movement of the train through differential 82. The one hour output gear 50g will not operate differential 80 because the one hour holes were punched on both insertions of the card. The net movement of the final drive shaft 84 of the differential train is 10 hours forward.

The printing wheel drive is also shown diagrammatically in Fig. 24. The hour printing wheels 94, 94A are not driven directly from the shaft 84 but through an additional or "mixing" differential 85 which, together with a Geneva gear 86, provides a carry-over in both directions from the minute differential train, when the shaft 79 is turned in a forward direction from 59 to Zero or in a backward direction from Zero. The Geneva gear 86 comprises a gear whose driven gear 87 (Fig. 24) is turned forward or backward one step whenever the shaft 79 turns through its "0" or "60" position. This movement through suitable gearing, is conveyed to one driving member of mixing differential 85, the amplitude of the movement being equal to a movement of one hour imparted to the other driving member of differential 85 by the shaft 84 from the driven member of the last hour differential 83, thus adding or subtracting an hour at each operation of the Geneva gear.

Figure 5:
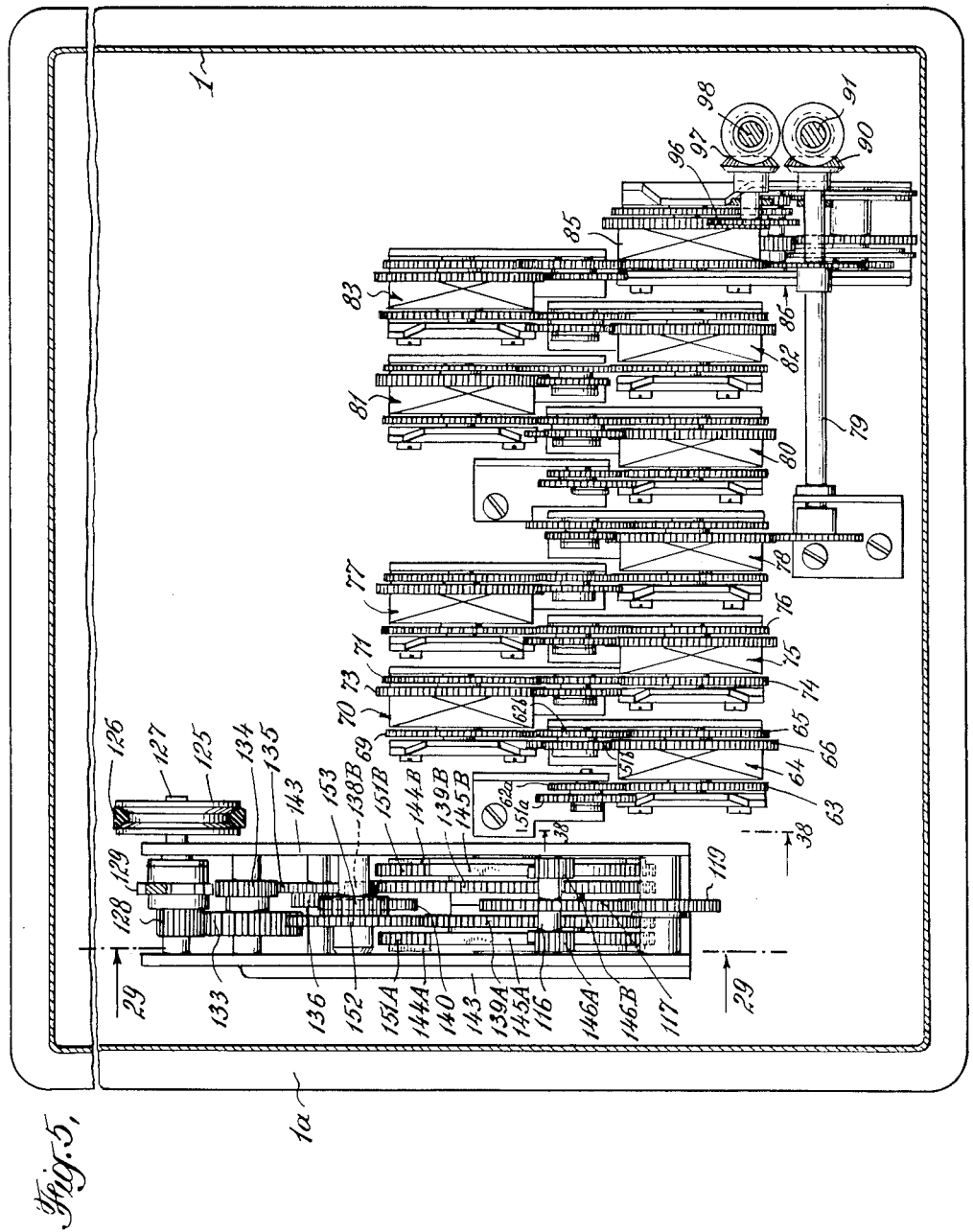
Fig. 5 is a view in horizontal section taken on line 5—5 of Fig. 4.

The minute printing wheels 88, 88A are driven from shaft 79 whose minimum movement is $1/60$ of a revolution when only the one-minute punch is operated, as indicated by the second line in Fig. 6 and whose maximum movement is $59/60$ of a revolution, when the punches indicated by the bottom line of Fig. 6 are operated. The "minute" printing wheels are geared to the shaft 79 in such manner as to operate in minute steps but they bear indicia to print in the nearest hundredths of an hour. The movement of shaft 79 is transmitted to the driving gear 89 of the "minute" wheel mechanism through bevel gears 90, upright shaft 91, bevel gears 92, a pinion 93 and an idler 93A (Figs. 24, 2 and 5).

The hour printing wheels 94, 94A are turned from the driven member of mixing differential 85 whose movement is in twenty-fourths of a revolution. The hour printing wheel mechanism is arranged to repeat the hour printing every twenty-four hours. The movement of the driven member of differential 85 is conveyed to the driving gear 95 of the hour wheel mechanism through a pinion 96, bevel gears 97, upright shaft 98, bevel gears 99 and idler 100A and pinion 100.

A typical differential gear mechanism such as those shown in Fig. 24 diagrammatically, is illustrated in detail in Figs. 42–44, the first minute differential gear mechanism 64 being here shown. Two bracket members 101 and 102 support between them a stationary shaft 103 having a collar 104 fixed centrally thereof. Input gear 63 is keyed to a hub member 105 which turns on shaft 103, and input gear 65 is keyed to a hub 106 which also turns on shaft 103 on the opposite side of collar 104. On the inner ends of hubs 105 and 106 there are keyed two sun gears of equal diameter and number of teeth, indicated at 107 and 108, respectively.

Between input gears 63 and 65, and adjacent to gear 65, is located the output gear 66 which is a rim gear mounted on one disc 109, of a planet spider or planet pinion carrier indicated generally by numeral 110 (Fig. 42). This spider comprises disc 109 and a similar disc 111, which have central rectangular sections 112 pressed laterally inward from the planes of the respective discs and contacting one another along their parallel surfaces as may be seen in Fig. 42. The parallel center portions of sections 112 have a bore 112A which fits collar 104 to support the spider for rotation. Between the two discs 109 and 111 are carried four short shafts 113 which are fixed at their opposite ends by staking, or otherwise, in apertures in the respective discs and hold the discs together to form the spider unit of the differential.

Turning on these shafts 113 are four similar planet pinions arranged in two pairs 114, 115 (Fig. 43). Each of these pinions has a hub which extends the full distance between discs 109 and 111 and teeth which extend only partway across, as shown in Fig. 44. The pinions of each pair face in opposite directions, and the width of the tooth portions is such that the teeth of each pair of adjacent pinions overlap and mesh with one another, but the respective pinions also mesh with opposite sun gears 107 or 108. Thus, the teeth of planet pinions 114 mesh with the teeth of sun gear 108, while the teeth of planet pinions 115 mesh with those of sun gear 107.

*Drive and cycling mechanism*

The cycling mechanism, which operates the punches, sensors, computing and printing mechanisms at each insertion of a card in the machine, comprises two Geneva gears indicated generally by reference characters A and B (Fig. 25). These two Geneva gears are simultaneously turned in opposite directions of rotation through one complete revolution during each complete cycle. They drive a common shaft 116 (Fig. 32) to which, during the computing part of the cycle, they impart two complete revolutions (Fig. 33) and to which, during the decomputing part of the cycle, they transmit two complete revolutions in the opposite direction of rotation. The Plus and Minus driving gears 46 and 47 of the computing mechanism make four revolutions during the computing operation and a like number during decomputing, as will now be seen.

Shaft 116 has fixed to it a gear 117 which operates the two drive shafts for the computing mechanism simultaneously in opposite directions of rotation. The Plus drive shaft 118, which drives all of the Plus driving gears 46 of the eleven selective transmissions of the computing mechanism, is driven in the counterclockwise direction (Fig. 29) from driving gear 117 through an idler 119 and a pinion 120 on Plus drive shaft 118. The Minus drive shaft 121 is driven in the clockwise direction by means of a pinion 122 which meshes directly with driving gear 117. This gearing multiplies the two revolutions of shaft 116 into four revolutions of shafts 118 and 121.

Both of these Plus and Minus drive shafts extend the full width of the machine, as indicated in Fig. 30. The Plus drive shaft 118 has a series of eleven gear teeth 123 spaced lengthwise thereof which drive the respective Plus driving gears 46 of the selective transmissions with a one-to-one ratio. Similarly, the Minus drive shaft 121 has a series of eleven gear teeth 124 (Fig. 31) which drive the respective Minus driving gears 47 of the selective transmissions with a one-to-one ratio.

The train of gears which serves to connect driving motor 31 with the Geneva cycling gears A and B, and with the punch operating cam 29 and the sensor operating cam 45, is shown diagrammatically in Figs. 25 and 28 and illustrated in Fig. 1, and in detail in Figs. 29–31.

Driving motor 31 drives a pulley 125 through a belt 126, this pulley being fixed to a short shaft 127 on which is a pinion 128 and a ratchet 129. The teeth of this ratchet are engaged by a pivoted dog 130 (Fig. 1) which is actuated by the plunger 131 of a solenoid 132, the coil of which is connected in parallel with the circuit of motor 31 (Fig. 52) so that both are energized simultaneously. The purpose of this solenoid controlled ratchet 129 is to prevent overtravel of the computing mechanism and printing wheels at the end of the operating cycle. A clutch (not shown) is provided between shaft 127 and pinion 128. This clutch is disengaged when dog 130 engages ratchet 129, thereby permitting coasting of the motor.

The teeth of pinion 128 mesh with those of a gear 133 fixed to another short shaft to which another pinion 134 is also fixed. This pinion meshes with a gear 135 mounted on a common hub with a pinion 136, whose teeth mesh with those of adjacent gear 137. Gear 137 has an adjacent pinion 138A, the two being mounted on the same hub, and this pinion drives the large operating gear 139A of the Geneva cycling gear A (Figs. 29 and 37).

The teeth of gear 137 also mesh with the teeth of another gear 140 of the same diameter so that these two gears operate at the same rotative speed but in opposite directions. On the hub of gear 140 is another pinion 138B of the same size as pinion 138A. Pinion 138B drives the operating gear 139B of the Geneva cycling gear B, the two gears 139A and 139B (and their Geneva gears A and B), Figs. 31 and 37, thus rotating simultaneously at the same speed but in opposite directions. From Fig. 37 it may be seen that these two operating gears 139A and 139B are keyed to hub members 141A and 141B which turn on a common stationary shaft 142, carried between two parallel bracket members 143, these brackets extending upwardly from the base 1A (Fig. 1).

The two Geneva cycling gears A and B are alike. They comprise locking discs 144A and 144B and mutilated gears 145A and 145B, each having teeth which extend part of the way around its periphery. These two like parts for each of gears A and B are shown separately in Figs. 35 and 36. The disc and mutilated gear constituting gear A are mounted side-by-side and keyed to the hub 141A. The pair forming gear B is keyed to hub 141B. Locking disc 144A and mutilated gear 145A (gear A) coact with a special Geneva pinion 146A which is fixed to shaft 116, previously referred to. Disc 144B and gear 145B (gear B) coact with a similar pinion 146B also fixed to shaft 116.

The arrangement is such that during a part of a revolution of Geneva gear A, pinion 146A is rotated, to rotate shaft 116 in one direction; during another part, it is locked stationary so as to prevent rotation of shaft 116; and during still another part of the revolution, pinion 146A is not engaged by either the locking disc 144A or gear 145A, and consequently, is free to rotate independently of gear A. The arrangement is similar for pinion 146B and gear B.

Pinions 146A and 146B are notched, the end portion of one tooth of each pinion being cut away (Fig. 32) so as to allow the edge of the coacting locking disc to engage the two full length teeth on opposite sides of the notched tooth (Figs. 29, 33 and 34) and prevent rotation. When either of two arcurate projections 147 or 148 provided on discs 144A and 144B is in engagement with the coacting pinion, the pinion is held in locked position, but that when either of the recessed sections 149 or 150 on the peripheries of the discs is opposite the coacting pinion, the pinion and shaft 116 are unlocked and free to rotate.

The discs and mutilated gears are so paired that the toothed portion of each gear is adjacent one of the recessed sections of its companion disc. Thus, for Geneva gear A, the toothed portion 151 of gear 145A companions with the recessed portion 149 of disc 144A, as shown in Fig. 33, and for Geneva gear B, its toothed portion 151 companions with recessed portion 150 of disc 144B (Fig. 34). Since the two Geneva gears A and B are rotated simultaneously in opposite directions, starting with both gears in the same angular position, the shaft 116 is driven two rotations in one direction (there being 16 teeth on portion 151 of each gear and the pinions having 8 teeth). Following this is a period when shaft 116 is locked against rotation, and then another period when it turns two revolutions in the opposite direction, this being followed by another period during which the shaft is locked.

This produces the cycle of operation of the computing mechanism indicated in the Figs. 33–34 charts which will be set forth in detail further on.

Referring now to Figs. 28 and 25, the drive for the punch operating cam 29 and sensor cam 45 is through a train of gears from operating gear 139A of Geneva gear A. These gears are shown diagrammatically in Fig. 28 but also in their approximate relative positions in the machine, and they are also shown in Fig. 1, mostly in dotted lines, and in Fig. 12. A gear 152 is driven from operating gear 139A and has a pinion 153 fixed to it (Fig. 12) which meshes with another gear 154 above it. A gear 155 on the shaft 160 of gear 154 drives in series two gears 156 and 157. Meshing with gear 157 is a gear 158, which is keyed to the shaft of punch cam 29, and also meshing with the lower side of gear 157 is another gear 159, which is keyed to the shaft of sensor cam 45.

Returning to the cycle of operation, a series of points (1–5) have been marked on each of gears A and B to facilitate the description. At the beginning of each cycle the two points 1 are opposite shaft 116 and projections 147 of both locking discs 144A and 144B are engaged with pinions 146A and 146B, so that shaft 116 and the Plus and Minus drive shafts 118 and 121 are held stationary. As the Geneva gear A is rotated clockwise, and Geneva gear B is simultaneously rotated counterclockwise, teeth 151 of gear A approach, and teeth 151 of gear B recede from the pinions. During this period while points 2 move to the pinions, sensor cam 45 and punch cam 29 are being operated through the gearing just described to lift the series of sensor pins 42 and 43 into engagement with the card, and to cause the operation of those of punches 22 which are to be operated to punch holes in the card, as determined by the angular positions of the time wheels a–l.

As points 2 reach pinions 146A and B teeth 151 of gear A engage pinion 146A and pinion 146B is unlocked by gear B, and shaft 116 rotates in the counterclockwise direction (Fig. 33). The Plus and Minus drive shafts 118 and 121 and the Plus and Minus driving gears 46 and 47 of the eleven selective transmissions of the computing mechanism are thus rotated in opposite directions through four revolutions each. The output gears 50a–50l of the selective transmissions are rotated through four revolutions either in the Plus, or Minus direction, or are held stationary, according to the dictation of the time wheels a–l and of whatever holes may have previously been punched in the card. These movements of the eleven output gears 50a–50l are evaluated by the several differential mechanisms (Fig. 24) resulting in the turning of the printing wheels 88, 88A and 94, 94A to indicate the elapsed time (this is the time from "Zero" to the then time of day, if the operation is at the first insertion of a card, or the elapsed time between the two insertions of the card, if the operation is at the second insertion). This is the computing portion of the cycle.

At the end of the two revolutions of shaft 116, the two points 3 on the respective gears A and B have reached the two pinions 146A and 146B and these are again both locked, this time by the short projections 148. During this locking period, the printing of the elapsed time on the card takes place. This is accomplished by means of a hammer 184 (Fig. 8) in the form of an elongated bar which is forced upward against the bottom of the card and presses it against an ink ribbon 185 just beneath the print wheels indicated collectively at P. These include the hour and fraction of an hour wheels 88 and 94 as well as the year, month and day wheels yet to be described.

Hammer 184 moves in an opening in plate 2 and is supported and actuated by two arms 186 on a short pivoted rock shaft 187. An actuating tension spring 188 is connected to shaft 187 through a lever 189. The hammer is withdrawn from printing position and spring 188 placed under tension, by a pivoted lever 190 which is engaged by a cam 191 on the shaft of sensor cam 45, and which is connected to lever 189 by a link 191a. The high point of cam 191 releases the hammer after the two points 3 on Geneva gears A and B pass the two pinions on shaft 116 and this shaft is locked.

As the two points 4 reach the pinions projections 148 release them and recessed section 150 of Geneva gear A frees pinion 146A so that shaft 116 can rotate for decomputing, and the teeth 151 of Geneva gear B commence to mesh with pinion 146B to turn shaft 116 in the opposite or decomputing direction. This causes two complete rotations of shaft 116 and four complete rotations of the Plus and Minus drive shafts 118 and 121, and the Plus and Minus driving gears 46 and 47 of the eleven selective transmissions, which results in turning the output shafts 50a–50l back to "Zero," that is, to say those of such shafts as were rotated during the computing operation. As the two points 5 reach the pinions the last tooth of gear section 151 of gear B leaves pinion 146B, and the long projections 147 of both gear A and gear B again engage and lock the two pinions 146A and 146B.

Movement of the two Geneva gears continues in opposite directions of rotation until their original angular positions are reached, as shown in Figs. 33 and 34, which completes the cycle. It will be understood that during the last part of this movement, cams 29 and 45 cause the punches 22 to be raised and the sensor pins 42 and 43 to be lowered, so that the machine is now ready to commence another cycle at the next card insertion.

*Computer locking mechanism*

During the computing portion of the cycle of operation above described, should any of the shifter bars 54 of the eleven selective transmissions (Fig. 20) of the computer mechanism move out of the position to which they had been shifted by the respective tilting members 44, this would produce an incorrect positioning of the printing wheels of the printing mechanism. Such shifting of any of the shifter bars 54 would prematurely disengage the teeth of the interconnecting gears 48 or 52, or cause premature engagement of these gears with their respective gears 46, 49, and 47, 53.

In order to prevent such undesired shifting, each of these eleven bars 54 is provided at its rear end (Fig. 20) with two upwardly projecting teeth forming, with the end of the bar, three locking surfaces or shoulders 162. An elongated locking bar 163, shown in detail in Figs. 45–49, is pivoted at its opposite ends in brackets 164 which project horizontally from a cross frame member 165 edgewise mounted at the rear of the machine adjacent driving motor 31 (Fig. 2). Locking bar 163 thus extends crosswise of the ends of shifter bars 54.

Its pivots 166 (Fig. 47) are approximately in line with its rear edge and the bar may be rocked from its horizontal or locking position (Fig. 49) to an upwardly tilted position shown in Figs. 47 and 48. Locking bar 163 has a nose portion along its front edge which, when the bar is in locking position, is arranged to engage the front ends of shifter bars 54, or either of the shoulders 162. When locking bar 163 engages the ends of the shifter bars 54 (Fig. 49), they are locked in their right hand position, and when the locking bar engages the middle shoulders 162 the shifter bars are held in neutral position (Fig. 17), whereas when the third shoulder 162 is engaged the shifter bars are held in their left hand position (Fig. 20).

The locking bar 163 is biased to locking position by means of a tension coil spring 167 (Figs. 45–46), one end of which is attached to the free end of an arm 168 which is fixed to lock bar 163 near one end. The locking bar is rocked to disengage the shifter bars 54 by means of a lever 169 (Fig. 48) which is pivoted to the machine frame at 170 and which has an adjustable screw 171 which bears against the lower surface of the locking bar. The opposite end of lever 169 engages a cam 172 to rock the lever and in turn rock the locking bar from locking position, and vice versa.

Cam 172 is fixed to shaft 160 (Fig. 12) on which gear 154 is mounted (see also Fig. 28). Cam 172 is arranged to rock locking bar 163 to unlock the shifter bars 54 just as the Geneva cycling gears A and B are leaving position 1, that is, at the very beginning of the cycle. The cam lowers the locking bar so as to lock the shifter bars 54 while the sensor levers 40 are raised but before position 2 is reached and the operation of the computing mechanism commences.

The operation of locking bar 163 also actuates a safety switch 173 (Fig. 47) in the circuit of driving motor 31 (Fig. 52). This switch is closed by the engagement of the nose of locking bar 163 with an operating plunger or button 174, which takes place when the locking bar is in horizontal or locking position, as shown in Fig. 49. The arrangement is such that, as this switch is opened at the beginning of the cycle, that is, at position 1 of Fig. 33, and remains open if, for any reason, the locking bar 163 does not move to completely lock the shifter bars 54.

Referring now to Fig. 52 which illustrates the electrical circuits of the apparatus, when the supply conductors 175 are energized the circuit is closed through timing motor 4, starting the rotation of the time, or punch selector, wheels a–l. Upon the insertion of a card into the machine, the two starting switches 32, one operated by each opposite inside corner of the card, are closed through the mechanism illustrated in Fig. 7 and previously described.

These switches are reopened by means of a resetting cam 176 on shaft 45 soon after the corners of the card are cut off by operation of the two punches 38, which takes place during the early part of the cycle. This withdraws the two pins 34 from the two plates 36 so as to allow these plates to be moved outward by their springs. To permit early reopening of switches 32, a holding circuit is provided through the safety switch 173 described just above and which is arranged in parallel with the two switches 32, which are in series.

Upon the closing of switches 32, a circuit is completed from the upper conductor 175 (Fig. 52) through conductor 177 to the solenoid 132 (which prevents overtravel) and to cycling motor 31 and thence back to the lower supply conductor 175. After the safety switch 173 is closed and the two starting switches 32 are open, which occurs before position 2 of Fig. 33 is reached and computing commences, the circuit is maintained to motor 31 and solenoid 132 by means of a safety switch 173 until shortly after position 5. Stopping switch 178 (Figs. 50–51) is closed shortly before position 5 by a cam 179 which engages the operating plunger 180 of this switch.

Cam 179 is fixed to a shaft 181 (Figs. 1 and 11). This is a short shaft which rotates in bearings formed in a bracket 182 mounted on the machine frame above plate 2 and at the rear of punch cam 29. Shaft 181 is rotated by means of a gear 183 which meshes with the teeth of gear 158 which operates the punch cam. Switch 178 serves to maintain the circuit of driving motor 31 until the cycle as above described has been completed, at which time the high point of cam 179 releases the spring biased plunger 180 causing switch 178 to open and stop motor 31.

At the very beginning of the cycle of operation, before the punches descend, it is important to lock the punch selector cams or time wheels a–l so that they cannot be advanced by the clock motor 4 during the cycle. This is accomplished for the minute and hour wheels respectively by the mechanisms shown in Figs. 15 and 16.

The shaft 5 carrying the minute time wheels is provided with a ratchet disc 192 (Figs. 12 and 15) having 60 teeth, and cooperating with this disc is a pawl 193 which is pivoted to a bracket 194 mounted on plate 2. A tension spring biases this pawl into engagement with the punch cam 29. The operation is such that with the first movement of the punch operating levers 26 pawl 193 engages ratchet 192 and locks all of the minute wheels in the angular positions which they occupied at that instant. Then if the minute ratchet drive mechanism (Fig. 13) should function during the operating cycle, all of the minute wheels a–f will be prevented from moving forward until after the end of the cycle.

The holding pawl mechanism for the hour wheels g–l (Fig. 16) is identical with that just described except that the hour wheel locking 192a has only 24 teeth.

It is desirable to know the time of day represented by the angular positions of the minute and hour wheel shafts 5 and 8 which support, respectively, the minute punch selector cams or time wheels a–f, and the hour wheels g–l. Such time indicator mechanism is shown is shown in detail in Figs. 8, 11 and 12.

At the right end of shaft 8 and carried on upright brackets 195 and 196 (Fig. 12) are two cylinders or drums, i. e. an hour drum 197 and a minute drum 198. The hour drum carries numerals from 1 to 24 and the minute drum numerals from 1 to 60. These are viewed through a T-shaped window opening 199 in an arcuate shield 200. The drums 197 and 198 are hollow pressed metal members of small mass and are provided respectively with hubs 201 and 202 which support them for independent rotation on a stationary shaft 203 that is secured at its opposite ends in the U-bracket 196.

The hour drum 197 is driven from the hour wheel shaft 8 by means of a short parallel shaft 204 having pinions 205 and 206 fixed at its opposite ends. The teeth of pinion 205 mesh with the teeth of a gear 207 on shaft 8, and the teeth of pinion 206 with those of a gear 208 which is fixed to hub 201 of the hour drum.

The drive of the minute drum 198 from the minute shaft 5 is similar. A gear 209 is fixed to the hub 202 of drum 198, and a gear 210 of the same diameter is mounted on the right end of shaft 5 (Fig. 9). A short shaft 211 is supported for rotation by the two brackets 195 and 196, and at its inner end is a gear 212 which is driven from gear 210. At its outer end is a gear 213 whose teeth engage those of gear 209 to turn minute drum 198.

*Printing mechanism*

The printing, print wheel or counting mechanism is shown in Figs. 53–72. This mechanism is supported in a frame structure comprising a series of parallel vertical plates 214–218 (Fig. 53) suitably secured to one another to constitute a rigid structure and the whole is mounted upon the rear surface of a vertical plate 219 (Fig. 3) which extends across the front of the machine above plate 2. Plate 219 also carries the inking ribbon feed mechanism to be described later. The opposite ends of vertical plate 219 are bent forward at right angles and are pivoted at 220 on bracket members 221 which are secured to and project upwardly from plate 2.

The purpose of this arrangement is to allow the type wheels and ribbon feed mechanism to be swung outwardly and upwardly about pivots 220 for inspection, renewal of the ribbon, etc. On the outer bent over ends of plate 219 are provided two slide locking bars 22 (Figs. 1 and 4), each of which is provided with a projection 223 at its lower end which enters a notch in the upper edge of brackets 221 to lock the printing mechanism in operative position. Slide locks 222 are urged downwardly into locking position by means of coil springs 224, and are provided with laterally projecting handles 225 at their upper ends for manipulation.

The printing mechanism is divided into four sections from right to left of Fig. 53. The first section at the right is the hundredths of an hour section, hereinafter referred to as the decimal hour section. The following sections are the hours section, the days section and the months and years section. Gear 89 which operates the decimal hour section and gear 95 which operates the hours section are keyed to concentric shafts, namely, a sleeve shaft 226 and an inner shaft 227 which extends throughout all of the sections.

The two gears 89 and 95 mesh respectively with the idler gears 93A and 100A (Fig. 24) through which they are turned from the differential gear section of the computing mechanism. The idler gears 93A and 100A are disposed side-by-side and are also concentrically mounted (Fig. 2) on the center line of the two pivots 220 (Fig. 3), and when the printing and ribbon feed mechanism are turned outward for inspection, as just referred to, the driving gears 89 and 95 of the printing mechanism remain in mesh with their respective driving idlers 93A and 100A.

Referring now to the construction of the printing mechanism, it is to be remembered that the two gears 89 and 95 are turned forward during the computing portion of the operating cycle of the machine and then are turned backward during decomputing to return the printing wheels to Zero. Consequently the printing mechanism must be reversible.

The type wheels for the decimal hour section are mounted on sleeve shaft 226 which extends only as far as frame plate 215. The type wheels for the hours section are mounted on a second sleeve shaft 228 which is rotated by inner shaft 227 which is in turn driven by gear 95. The connection of sleeve 228 to this shaft is made by means of a cross pin 229 (Fig. 56) in shaft 227 the outer ends of which project into a slot 230 in one end of sleeve 228.

The printing wheels for the days section are carried on a sleeve shaft 231 which turns freely on shaft 227 and the years and months section wheels are carried on a further sleeve shaft 232 which also turns freely on shaft 227.

The decimal hour section and the years and months section are of conventional construction. 88 indicates the printing wheel which prints hundredths of an hour and 88A the wheel which prints tenths of an hour. Wheel 88 is keyed to sleeve shaft 226 as is also a conventional Geneva gear comprising a locking disc 235 and mutilated gear 236. These two parts coact with a Geneva pinion 237 of the type shown in Fig. 64. In this type of pinion portions of alternate teeth are removed on one side to form the locking disc member of the pinion which cooperates with locking disc 235 of the gear. This leaves the pinion with eight teeth on one side and only four teeth on the other side.

Geneva pinion 237 is fixed to one end of a short shaft 238, on the opposite end of which is keyed a pinion 239 having a full complement of teeth which mesh with the teeth of a gear 240 which is fixed to the hub of the tenths wheel 88A. This wheel turns freely on sleeve 226.

The numerals on the tenths of an hour wheel 88A are shown in Fig. 66 and those on the hundredths of an hour wheel in Fig. 65. Numerals on the former are consecutive from 0 to 9 while the numerals on the latter are 0, 2, 3, 5, 7 and 8, and these six numerals are repeated to make a total of twelve numerals extending around the circumference of the wheel. This combination produces the following:

Minute equivalent

| | |
|---|---|
| .10 | 6 |
| .12 | 7 |
| .13 | 8 |
| .15 | 9 |
| .17 | 10 |
| .18 | 11 |
| .20 | 12 |
| .22 | 13 |
| .23 | 14 |
| .25 | 15 |
| .27 | 16 |
| .28, etc. | 17 |

These decimal fractions of an hour are acceptable in factory practice in calculating workers' pay.

In operating the two wheels 88 and 234 it is only necessary to cause the tenths wheel 88A to advance one notch at each half revolution of the hundredths wheel 88. This is accomplished by providing two pairs of teeth on the periphery of Geneva gear 236 diametrically opposite one another (Fig. 54) and also a recess in Geneva disc 235 between each of these pairs of teeth. Then, at each half revolution of the hundredths wheel 88 Geneva pinion 236 is turned forward, and through pinion 239 and gear 240 causes the tenths wheel 88A to be advanced one numeral, i. e. one step.

The movement of sleeve shaft 226 and wheel 88 in steps is controlled by means of a star wheel 241 (Fig. 55) which is keyed to sleeve 226 on the outside of frame member 214. Coacting with this star wheel is a roller 242 which is carried on a pivoted lever 243 and yieldably urged against the star wheel by means of a coil spring 244.

A similarily arranged star wheel 241a is mounted at the opposite end of the unit on shaft 227, to control the movement of the hours wheels, a detailed description of which will be taken up later.

The days section of the printing mechanism is shown in Fig. 69 which is a vertical section taken principally on line 69—69 of Fig. 53 (see also Fig. 11). The tens wheel is indicated at 245 and the units wheel at 246. The units wheel is notched forward one step at the end of each twenty-four hours by means of a cam 247, keyed to the sleeve shaft 8 which carries the hour punch selector cams or wheels g—l (Fig. 12). Cam 247 operates lever 248 (Fig. 11) which is pivoted on a supporting rod 249 mounted between brackets one supported on each of the end plates 216 and 218 of the printing mechanism. Lever 248 is biased into engagement with cam 247 by means of a tension coil spring 250.

On the lower corner of lever 248 is pivoted a spring-biased pawl 251 having at its rear end a laterally projecting lug 252 which engages a shoulder 253 formed on the tail portion of a gear segment 254, which is centrally pivoted at 255 spaced somewhat from frame plate 216. This gear segment is biased by a coil spring 256 into engagement with lug 252. The front portion of segment 254 is provided with a series of gear teeth 257, which mesh with a series of similar teeth on a pawl carrier 258 mounted for rocking rotative movement on the portion of sleeve 231, which projects to the right of the units wheel 246, this wheel being integral with sleeve 231 (Fig. 53).

Carrier 258 has mounted on the side thereof opposite from the gear teeth a pivoted driving pawl which serves to drive the teeth of a ratchet wheel 260, which is keyed to sleeve 231 adjacent pawl carrier 258 (Fig. 53). A holding pawl 261 engages the teeth of ratchet wheel 260 and is pivotedly mounted on frame plate 216.

When the high point of the twenty-four hour cam 247 releases lever 248, lug 252 on pawl 251, engaging shoulder 253, rocks gear segment 254 causing pawl carrier 258 to rotate backwards carrying the nose of pawl 259 back and dropping it behind the next tooth. At this point, the tail of pawl 251 engages an adjustable stop screw 262 causing lug 252 to release shoulder 253, so that spring 256 rocks segment 254 and pawl carrier 258 in the opposite direction causing pawl 259 to advance ratchet 260 one notch.

The numerals on the units wheel 246 run from 0 to 9 and the numerals on the tens wheel 245 are arranged in three groups of 1, 2 and 3 as shown in Fig. 68, the groups being uniformly spaced apart with one blank space between them. During the time that a blank space on the tens wheel is in printing position at the bottom, the units wheel is notched forward starting at 1 and successively through 9. Then, as the units wheel turns from 9 to 0, the tens wheel simultaneously is notched forward to 1, to print 10. After this, the tens wheel remains in the 1 position while the units wheel is again notched from 1 to 9, thus printing 11 to 19. Thereupon, the two wheels again turn simultaneoulsy to 20.

The tens wheel remains in the 2 position while the units wheel is again notched from 1 to 9, printing 21 to 29. The wheels are then again advanced simultaneously to 30. The tens wheel remains in the 3 position while the units wheel could be advanced from 1 to 9 to print 31 to 39. However, at the beginning of each month, the month wheel is changed manually and at the same time the tens and units day wheels are set at "blank" and "1" respectively.

The actuation of the tens wheel 245 by the units wheel 246 is through a Geneva gear 263, the two elements of which are keyed to sleeve 231, which is part of the units wheel, and a cooperating Geneva pinion 264. This pinion is made like Geneva pinion 237 (Fig. 64) except that the righthand portion, having full teeth, is made of double width so that these teeth not only engage the teeth of the mutilated gear section of Geneva gear 263, but also the teeth of the driving gear 264a for the tens wheel 245. The operation of these parts is the same as that of the corresponding parts described in connection with the decimal hour section of the printing mechanism with the exception that the Geneva gear 263 has only one pair of teeth in its gear section and one notch in its disc section, whereas the Geneva gear 235, 236 of the decimal hour section has this same series at two diametrically opposite points on its periphery.

The years and months section comprises a months wheel 265, which is keyed to sleeve 232 that turns freely on shaft 227. The years wheel 266 turns freely on sleeve 232. A Geneva gear 267 is keyed at the end of sleeve 232 and meshes with a Geneva pinion 268, which turns loosely on a supporting shaft 269. The teeth of this pinion also engage a ring 270 of continuous teeth, formed on a shoulder on the years wheel 266. By means of this arrangement, it will be understood that when the months wheel 265 has made a complete revolution, the years wheel will be advanced one notch to the next year.

This years and months section is not automatically operated from shaft 227, but is set manually at the beginning of each month. To facilitate manual setting, a toothed wheel 271 on shaft 269 has its teeth in mesh with a ring of gear teeth 272 formed on a shoulder of months gear 265. By engaging the end of shaft 269 with a suitable key the months wheel can be moved ahead from month to month. In order to line up the letters representing each month with the remainder of the type wheels, a four-pointed star wheel 273 is fixed to the outer end of shaft 269 (toothed wheel 271 being keyed thereto), and a flat spring (not shown) is arranged to bear against the edge of this star wheel.

The hours section of the printing mechanism will now be described. It will be remembered that during the computing portion of the cycle of operation of the machine, the driving gears 89 and 95 of the decimal hour and hours sections are respectively turned through an angular distance corresponding with the elapsed time, as dictated by the positions of the punch selector cams or time wheels $a$—$l$. Also, during the decomputing portion of the cycle, these two gears 89 and 95 are rotated in the reverse direction the same angular distance thereby returning the printing mechanism to "Zero."

In order to overcome the large size of type wheel, which would be required in a conventional twenty-four hour mechanism where twenty-four characters are placed on one wheel, the mechanism about to be described, employing two type wheels of the same diameter as the decimal hour wheels and having full size characters, has been devised. This mechanism is capable of turning the two wheels to 24 individual positions with one revolution of each wheel, and will return the wheels to "Zero" position with the same angular movement in the reverse direction.

To accomplish this, the two printing wheels 94A and 94 (hereinafter referred to as the 1st wheel and the 2nd wheel, respectively), with the characters or numerals thereon shown in Fig. 70, are employed. As shown, the 1st wheel contains the following characters: blank, 1, 2, 3, 4, 5, 6, 7, 8, 9, 1, 2. The 2nd wheel contains: blank, 0, 1, 2, 3, 4, 5, 6, 7, 8, 9, 0, 1, 2, 3.

In operation, the 1st wheel turns to printing position unit hours from 1 to 9, inclusive. The two wheels then turn in unison, bringing down 1 on the 1st wheel and 0 on the 2nd wheel, to print 10. Then the 1st wheel is held in stationary position, and the 2nd wheel turns down the successive units from 1 to 9, whereby the two wheels print 11, 12, 13, 14, 15, 16, 17, 18 and 19. At this point, both the 1st and 2nd wheels again turn in unison, the 1st wheel turning to 2 and being held in this position while the 2nd wheel turns to 0 (printing 20) and continues to turn through the tens 1, 2 and 3. At that point, both wheels again turn in unison thus arriving at the starting position (both blank).

When operating in the reverse direction, both wheels turn in unison from the blank positions back to 23. Then, the 2nd wheel continues on to 2 to 1 to 0. At that point, both wheels turn in unison, showing 1 on the 1st wheel and 9 on the 2nd wheel. The 2nd wheel then continues to turn from 9 back to 0 and at that point both wheels again turn backward in unison, bringing down 9 on the 1st wheel and blank on the 2nd wheel. The 1st wheel then continues in the reverse direction from 9 to 0 and then to blank.

As above indicated, the final positions of the two wheels, after any computing operation, depends upon the dictation of the time wheels or punch selector cams $a$—$l$ (Figs. 9–12) and such final positions of the 1st and 2nd wheels can be any one of the 24 positions just described. The mechanism for coordinating the 1st and 2nd wheels to turn them to any one of these 24 positions is illustrated in Figs. 53, and 56–59, particularly Fig. 59, and is shown diagrammatically in the exploded view, Fig. 70.

Referring to these figures, and more particularly to Fig. 70, the drive shaft 227 extends from right to left through this mechanism and has keyed to it (through sleeve 228) a drive gear 276. This gear has a full complement of teeth and is continuously engaged with a drive pinion 277 (Fig. 59). The teeth of this pinion also mesh with those of an intermittent gear 278, which is keyed to the hub 279 of the 1st printing wheel 94A, together with the driving gear 280 and lock disc 281 of a Geneva gear X. Fixed to the same shaft 282 as pinion 277 is a drive pinion 283 which drives intermittent gear 284. This gear is keyed to the hub 285 of the 2nd printing wheel 94 together with the gear element 286 and locking disc 287 of a 2nd Geneva gear Y.

Coacting with Geneva gear X is a Geneva pinion X and with Geneva gear Y a Geneva pinion Y, these two pinions being fixed to the same shaft 288 (Fig. 59). These Geneva gears X and Y either drive or are driven by each other according to the required movement of the 1st and 2nd printing wheels.

Commencing with the blank position of both printing wheels at printing position and operating in an increasing direction, drive gear 276 turns drive pinions 277 and 283 (Fig. 70). Drive pinion 277 is in position of mesh with intermittent gear 278 and, in this position, can turn this gear for increasing values only, and for the present, drive pinion 283 turns in the idling position of intermittent gear 284.

Geneva gear X and the 1st printing wheel are rotated by intermittent gear 278, and as this gear is turning further into locked position with Geneva pinion X, Geneva pinion Y is thereby held stationary, together with Geneva gear Y and the 2nd printing wheel. These positions are held while the 1st printing wheel passes through printing positions 1, 2, 3, 4, 5, 6, 7, 8 and 9. At this time, in passing from position 9 to position 1, the leading teeth 289 of Geneva gear X engage Geneva pinion X, and in so doing, turn Geneva pinion Y which drives Geneva gear Y turning the 2nd printing wheel to the 0 position. This turns intermittent gear 284 into mesh with drive pinion 283. At the same time, the trailing teeth 290 of intermittent gear 278 are disengaged from drive pinion 277; also, the 1st printing wheel is turned to bring numeral 1 to printing position, and is locked in this position.

Drive pinion 283, which has just come in mesh with intermittent gear 284, now turns this gear and the 2nd printing wheel through printing points or positions 1–9, which together with the 1st wheel print 10, 11, 12, 13, etc. Between printing position 9 and position 0 of the 2nd wheel the proportionately located teeth 291 on the gear element of Geneva gear Y pass through Geneva pinion Y and thus advance the 1st printing wheel from printing position 1 to position 2, still leaving intermittent gear 278 out of mesh with drive pinion 277.

These positions are held while the 2nd printing wheel passes through printing positions 1, 2 and 3, which, together with the 1st wheel, print 20, 21, 22 and 23. In turning further, changing from position 3 to the blank position of the 2nd wheel, Geneva gear Y advances Geneva pinion Y and Geneva pinion X, the latter turning Geneva gear X thereby turning the 1st wheel to its blank printing position, at the same time turning intermittent gear 278 again into mesh with drive pinion 277, and moving intermittent gear 284 out of mesh with drive pinion 283. This completes the cycle of this printing mechanism. When the shaft 227 turns in the reverse direction, the same movements take place in reverse sequence.

Figure 4:
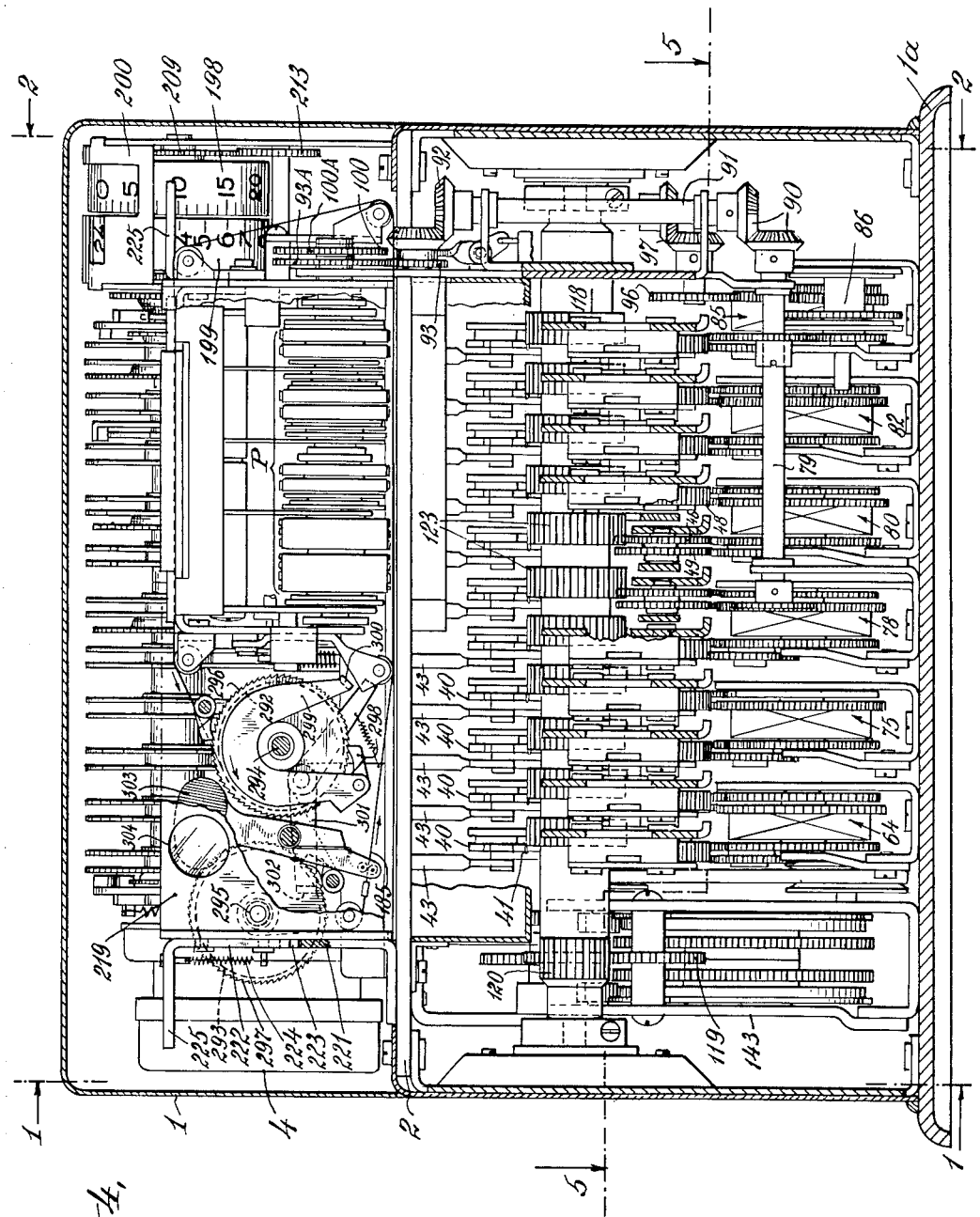
Fig. 4 is a front elevation with the casing removed.

The ribbon feed mechanism for the printing mechanism is of conventional construction. It is shown more particularly in Fig. 4 but also in Figs. 1, 2 and 3. In Fig. 4 the supporting plate 219 for both the printing mechanism and the ribbon feed, has been removed. The inking ribbon 185 is secured at its opposite ends to reels 292 and 293 (Fig. 3) which turn on shafts 294 and 295. Ribbon 185 is trained around suitable guide rollers so that it passes from reel 293 beneath the print wheels (indicated generally by reference letter P) and thence upward and over the top of the printing mechanism back to reel 292.

The two reels are provided with ratchets 296, 297 and the ribbon is fed onto reel 292 by means of a driving pawl 298 which is carried on a rocking member 299 pivoted on a stud in plate 219. This member has a rearwardly horizontal extension 300 which is engaged at its rear end by the right end of a lever 301 (Fig. 3) pivoted on the frame of the machine. At its opposite end this lever also has a rearward extension 302 which is depressed by one of the levers 39 for operating the punches which cut out the corners of the card. In this way, at each operating cycle of the machine, lever 39 is depressed thereby causing the operation of the ribbon feed mechanism to feed the ribbon forward.

When the ribbon has been completely wound onto spool 292, a red signal 303 is shifted opposite a window 304 in plate 219. The reels are then interchanged manually or a new ribbon is inserted.

The punchings which result from the operation of the eleven punches 22 and the corner punches are received within a chamber 305 (Fig. 1) immediately below plate 2, this chamber being closed by a pivoted door 306 having a handle 307.

An exemplifying disclosure of the machine of the invention has been given hereinabove and by means of the accompanying drawings. It will be understood that various changes in the construction and the arrangement of the several parts of the machine can be made without departing from the spirit of the invention, the scope of the invention being set forth in the accompanying claims.

I claim:

1. An elapsed time recorder comprising a card receiver arranged to receive a record card in one predetermined manner, card perforating mechanism for perforating the card according to a predetermined code representing the time of insertion into said receiver, said mechanism being controlled by time keeping mechanism, means for causing said perforating mechanism to perforate said card according to said code representing the time of reinsertion, means for sensing said perforations when the perforated card is reinserted in a different predetermined manner, recording mechanism, and mechanism controlled jointly by said sensing means and by said perforating mechanism for actuating said recording mechanism to record the difference between the times of said insertion and reinsertion of the card.

2. An elapsed time recorder comprising a card receiver arranged to receive a record card in one predetermined manner, card perforating mechanism for peforating the card according to a predetermined code representing the time of insertion into said receiver, said mechanism being controlled by time keeping mechanism, means for causing said perforating mechanism to perforate said card according to said code representing the time of reinsertion, means for sensing said perforations when the perforated card is reinserted in a different predetermined manner, reversible printing wheel mechanism normally standing at zero, computing mechanism controlled jointly by said sensing means and by said perforating mechanism, mechanically actuated means for operating said computing mechanism in one direction to turn said printing wheel mechanism from zero into position to print the difference between the times of said insertion and reinsertion of the card, and mechanically actuated means for operating said computing mechanism in the opposite direction to return said printing wheel mechanism to zero.

3. An elapsed time recorder comprising a card receiver arranged to receive a record card, time controlled card perforating mechanism for perforating the card according to a predetermined code representing the time of insertion into said receiver, means for sensing said perforations when the perforated card is reinserted in a different predetermined manner, means for sensing said perforating mechanism according to the perforations made thereby at said reinsertion, printing wheel mechanism normally standing at zero, and computing mechanism controlled jointly by said two sensing means for turning said printing wheel mechanism from zero into position to print the difference between the times of said insertion and reinsertion of the card.

4. An elapsed time recorder comprising a card receiver arranged to receive a record card, time controlled card perforating mechanism for perforating the card according to a predetermined code representing the time of insertion, means for sensing said perforations when the perforated card is reinserted in a different predetermined manner, means for sensing said perforating mechanism according to the perforations made thereby at said reinsertion, reversible printing wheel mechanism normally standing at zero, computing mechanism controlled jointly by said two sensing means for turning said printing wheel mechanism from zero into position to print the difference between the times of said insertion and reinsertion of the card, and means for operating said computing mechanism in the opposite direction to return said printing wheel mechanism to zero.

5. An elapsed time recorder comprising, in combination, a card receiver arranged to receiver a record card, a plurality of punches having a predetermined arrangement and preassigned time values corresponding to hours and fractions of an hour, operating mechanism for said punches, time-controlled selecting mechanism for said punch operating mechanism enabling said punches, when a card is first inserted in said receiver, to make a set of holes in the card corresponding to the time of day, a stop guage for limiting the movement of said card into said receiver, means for cutting off a portion of said card opposite said stop to allow the card to enter farther into said receiver at a second insertion whereby said punches will make a second set of holes in the card correponding to the time of said second insertion, means for sensing said first set of holes, means for sensing said perforating mechanism according to the perforations made thereby at said second insertion, and computing-printing mechanism controlled jointly by said sensing means for printing the elapsed time between said first and second insertions.

6. An elapsed time recorded comprising, in combination, a card receiver arranged to receive a record card, a series of punches having a predetermined arrangement and preassigned time values corresponding to hours and fractions of an hour, operating mechanism for said punches, time-controlled selecting mechanism for said punch operating mechanism enabling said punches, when a card is first inserted in said receiver, to make a set of holes in the card corresponding to the time of day, a stop for limiting the movement of said card into said receiver, means for cutting off a portion of said card opposite said stop to allow the card to enter farther into said receiver at a second insertion whereby said punches will make a second set of holes in the card corresponding to the time of said second insertion, means for directly sensing the first set of holes, means for indirectly sensing the second set of holes, and computing-printing mechanism controlled jointly by said sensing means for printing the elapsed time between said first and second insertions.

7. An elapsed time recorder comprising a card receiver arranged to receive a card, a plurality of time controlled card punching mechanisms for perforating the card according to a predetermined code representing the time of insertion into said receiver, each of said punching mechanisms having a device for sensing said perforations when the perforated card is reinserted in a different predetermined manner, each of said punching mechanisms having means for sensing its own operation according to whether or not a perforation is made thereby at said reinsertion, printing wheel mechanism, and computing mechanism comprising a train of differential gear mechanisms corresponding in number to said punching mechanisms, said train having the driving gear of one of said differential mechanisms connected to turn one driving gear of the next differential mechanism in the train, the driven member of the final differential mechanism of the train turning said printing wheel mechanism, and plus and minus oppositely rotating driving members operated through a predetermined number of revolutions at each card insertion, both driving gears of said first differential mechanism of the train and the second driving gear of each of said subsequent differential mechanisms being connectible for rotation by said plus or minus driving members under the joint control of the sensing device and sensing means of the respective punching mechanisms.

8. An elapsed time recorder comprising a card receiver arranged to receive a card, a plurality of time controlled card punching mechanisms for perforating the card according to a predetermined code representing the time of insertion into said receiver, each of said punching mechanisms having a device for sensing said perforations when the perforated card is reinserted in a different predetermined manner, each of said punching mechanisms having means for sensing its own operation according to whether or not a perforation is made thereby at said reinsertion, printing wheel mechanism, and computing mechanism comprising a train of differential gear mechanisms corresponding in number to said punching mechanisms, said train having the driving gear of one of said differential mechanisms connected to turn one driving gear of the next differential mechanism in the train, the driven member of the final differential mechanism of the train turning said printing wheel mechanism, plus and minus oppositely rotating driving members operated at each card insertion through a predetermined number of revolutions first in the computing direction of rotation and then the same number of revolutions in the opposite direction, both driving gears of said first differential mechanism of the train and the second driving gear of each of said subsequent differential mechanisms each being connectible for rotation by said plus or minus driving members under the joint control of the said sensing device and sensing means of the respective punching mechanisms, a printing hammer, and means for operating said hammer at the end of rotation in said computing direction.

9. In an elapsed time recorder, a computing mechanism comprising a plurality of rotary computing members, a train of differential gear mechanisms corresponding to the rotary computing members, said differential gear mechanisms being connected in series, the driving members of the first differential mechanism of said train being connected respectively to the first and second of said rotary computing members and the second driving members of the respective remaining differential gear mechanisms being connected respectively to the remaining rotary computing members, mechanism for actuating said rotary computing members during a predetermined computing cycle, said mechanism including means for selecting which of the rotary computing members shall be actuated and in which direction of rotation each of said selected rotary computing members shall be turned during said cycle, and a printing wheel mechanism turned by the driving member of the last differential mechanism of said train.

10. In an elapsed time recorder, a computing mechanism comprising a plurality of rotary computing members, a train of differential gear mechanisms corresponding to the rotary computing members, said differential gear mechanisms being connected in series, the driving members of the first differential mechanism of said train being connected respectively to the first and second of said rotary computing members and the second driving members of the respective remaining differential gear mechanisms being connected respectively to the remaining rotary computing members, means for selectively actuating during a predetermined computing cycle said rotary computing members to rotate in the positive direction, in the negative direction, or to remain stationary, and a printing wheel mechanism turned by the driven member of the last differential mechanism of said train.

11. In an elapsed time recorder, a computing mechanism comprising two sets of rotary computing members, one set to compute the hours and one set to compute fractions of an hour, a train of differential gear mechanisms corresponding to the rotary computing members of each set, said differential gear mechanisms of each train being connected in series, the driving members of the first differential mechanism of each train being connected respectively to the first and second rotary computing members of said respective sets and the second driving member of the remaining differential gear mechanisms of each train being connected respectively to the remaining rotary computing members of the respective sets, means for selectively actuating during a predetermined computing cycle said rotary computing members of each set to rotate in the positive direction, in the negative, or to remain stationary, a printing wheel mechanism for printing fractions of an hour turned by the driven member of the last differential mechanism of one train, and a printing wheel mechanism for printing the hours, said mechanism being turned by the driven member of a mixing differential gear mechanism, one driving member thereof being turned by said driven member of said last differential mechanism through a Geneva gear, and the second driving member of said mixing differential being turned by the final driving member of said second differential train.

12. In an elapsed time recorder, a card perforating and sensing mechanism comprising a card receiver, a series of punches and means for slidably supporting said individual punches in operative relation to said receiver to punch holes in a card inserted therein, a time controlled shaft having fixed in spaced relation thereon a series of cam wheels having projections and intervening spaces in the peripheral edges thereof, operating levers for said punches, a common punch operating cam cooperating with said levers to actuate them simultaneously, said levers being operatively associated with the peripheries of said respective cam wheels to cause the projections and spaces therein selectively to control the actuation of said punches upon rotation of said common cam thereby causing said card to be perforated according to a predetermined time code, a pair of sensing members corresponding to each of said punches and movable in predetermined paths, one of said members of each pair being associated with said card receiver to sense the card therein as to whether it is perforated at that location, and a part actuated by the lever of said punch into and out of the path of said other sensing member of each pair to cause said member to sense whether the operation of said lever causes a perforation to be made in the card by said punch.

13. In an elapsed time recorder, a card receiver, a series of punches and means for slidably supporting said individual punches in operative relation to said receiver to punch holes in a card inserted therein, a time controlled shaft having fixed in spaced relation thereon a series of cam wheels having projections and intervening spaces in the peripheral edges thereof, operating levers for said punches, a common punch operating cam cooperating with said levers to actuate them simultaneously, said levers being operatively associated with the peripheries of said respective cam wheels to cause the projections and spaces therein selectively to control the actuation of said punches upon rotation of said common cam to perforate said card according to a predetermined time code, a pair of sensing members corresponding to each of said punches movable in predetermined paths, one of said members of each pair being associated with said card receiver to sense the card therein as to whether it is perforated at that location, a part actuated by the lever of said punch into and out of the path of said other sensing member of each pair to cause said member to sense whether the operation of said lever causes a perforation to be made in the card by said punch, and a sensing lever for supporting each of said pairs of sensing members, said lever having a tiltable control member pivoted thereon, the respective sensing members of said pair being in turn pivoted to said tilting member on opposite sides of the pivot of said member on said lever.

14. In an elapsed time recorder, a card receiver, a series of punches and means for slidably supporting said individual punches in operative relation to said receiver to punch holes in a card inserted therein, a time controlled shaft having fixed in spaced relation thereon a series of cam wheels having projections and intervening spaces in the peripheral edges thereof, operating levers for said punches, a common punch operating cam cooperating with said levers to actuate them simultaneously, said levers being operatively associated with the peripheries of said respective cam wheels to cause the projections and spaces therein selectively to control the actuating of said punches upon rotation of said common cam to perforate said card according to a predetermined time code, a pair of sensing members corresponding to each of said punches movable in predetermined paths, one of said members of each pair being associated with said card receiver to sense the card therein as to whether it is perforated at that location, a part actuated by the lever of said punch into and out of the path of said other sensing member of each pair to cause said member to sense whether the operation of said lever causes a perforation to be made in the card by said punch, a sensing lever for supporting each of said pairs of sensing members, said lever having a tiltable control member pivoted thereon, the respective sensing members of said pair being in turn pivoted to said tilting member on opposite sides of the pivot of said member on said lever, and means for actuating the sensing levers while the punch operating levers are held in punch operating position.

15. In an elapsed time recorder, a card perforating and sensing mechanism comprising a card receiver, a series of punches and means for slidably supporting said individual punches in operative relation to said receiver to punch holes in a card inserted therein, a time controlled shaft having fixed in spaced relation thereon a series of cam wheels having projections and intervening spaces in the peripheral edges thereof, operating levers for said punches, a common punch operating cam cooperating with said levers to actuate them simultaneously, said levers being operatively associated with the peripheries of said respective cam wheels to cause the projections and spaces therein selectively to control the actuation of said punches upon rotation of said common cam to perforate said card according to a predetermined time code, a pair of sensing members corresponding to each of said punches and movable in predetermined paths, one of said members of each pair being associated with said card receiver to sense the card therein as to whether it is perforated at that location, a part actuated by the lever of said punch into and out of the path of said other sensing member of each pair to cause said member to sense whether the operation of said lever causes a perforation to be made in the card by said punch, a sensing lever for supporting each of said pairs of sensing members, said lever having a tiltable control member pivoted thereon, the respective sensing members of said pair being in turn pivoted to said tilting member on opposite sides of the pivot of said member on said lever, means for actuating the sensing levers while the punch operating levers are held in punch operating position, a computing mechanism comprising a rotary computing member corresponding to each of said punches, a printing wheel normally standing at zero position operated from said rotary computing members by an interconnecting train of differential gear mechanisms, plus and minus driving members, a transmission for selectively interconnecting each of said rotary computing members and said plus and minus driving members, the tilting member of each of said sensing levers serving to control said corresponding transmission to interconnect the rotary computing member thereof with said plus or minus driving member to leave said rotary computing member disconnected from both, and cycling mechanism for turning said plus and minus driving members equal and successive amounts thereby causing said printing wheel to be moved to printing position and returned to its normal zero position.

16. In an elapsed time computer, plus and minus oppositely rotating driving members, means for rotating them through a predetermined computing cycle, a rotary computing member, computing mechanism operatively connected thereto, a transmission mechanism for interconnecting said rotary computing member and said driving members including means for selectively connecting said rotary computing member with said respective driving members, or leaving said rotary computing member disconnected therefrom during the computing cycle, a sensing lever having a control member pivoted thereto tiltable to three positions, sensing fingers carried by said member, means for actuating said lever to bring said fingers into engagement with the material to be sensed, and means interconnecting said control member and said selective connecting means.

17. In an elapsed time computer, plus and minus oppositely rotating driving gears, means for rotating them through a predetermined computing cycle, a computing gear member, computing mechanism operatively connected to said computing gear, and a transmission mechanism for selectively interconnecting said computing gear and said respective driving gears comprising two idling gears meshing with said computing gear and respectively disposed contiguously and coaxially with said driving gears, a movable frame, a pair of connecting gears carried thereby and disposed one adjacent each of said driving gears, said frame when moved in one direction enmeshing the teeth of one connecting gear simultaneously with those of its adjacent driving gear and the idler gear contiguous thereto, thereby causing said driving gear to cause rotation of said computing gear, said frame when moved in the opposite direction disengaging said previously enmeshed gears and enmeshing the teeth of the opposite connecting gear simultaneously with those of the opposite driving gear and its contiguous idler, said frame when in mid position causing disengagement of both connecting gears, and locking means carried by said frame for holding in alignment with one another when said frame is in mid-position the teeth of said previously engaged gears.

18. In an elapsed time recorder, a card receiver arranged to receive a record card, card perforating mechanism for perforating the card according to a predetermined time code, said perforations being disposed in a predetermined pattern with respect to the inner edge of the card when it is positioned in said receiver, a yieldable stop guage engageable and movable by the front edge of the card adjacent each corner thereof to position the card in the receiver, mechanism for operating said perforating mechanism, and control means for said opertaing mechanism operable by said movable stop guages so as to prevent operation of said operating mechanism unless the inner edge of the card is correctly positioned within said receiver to cause the card to be perforated according to said predetermined pattern.

19. In an elapsed time recorder, a card receiver arranged to receive a record card, card perforating mechanism for perforating the card according to a predetermined time code, said perforations being disposed in a predetermined pattern with respect to the inner edge of the card when it is positioned in said receiver, a yieldable stop guage engageable and movable by the front edge of the card adjacent each corner thereof to position the card in the receiver, cutting mechanism for removing a portion of the card adjacent each of said stop guages so as to permit the card to enter farther into said receiver when reinserted therein, mechanism for operating said perforating mechanism and said cutting mechanism, and control means for said operating mechanism operable by said movable stop guages so as to prevent operation of said operating mechanism and the perforation and cutting of the card unless the inner edge of the card is correctly positioned within said receiver to cause the card to be perforated according to said predetermined pattern.

20. In an elapsed time recorder having a card receiver arranged to receive a record card, card perforating mechanism for perforating the card according to a predetermined time code, a yieldable stop plate shiftable by the front edge of the card adjacent one corner thereof to position the card in the receiver, and an electric motor for operating said perforating mechanism, a control circuit for said motor including a normally open starting switch having an actuating lever adjacent said stop plate, a control pin carried by said lever, a spring for biasing said switch to closed position, the switch being held open by the engagement of said pin with the surface of said plate, said plate having an aperture into which said pin moves allowing the switch to close when the card has shifted said plate.

21. In an elapsed time computer, a series of rotary computing members, computing mechanism operated thereby, plus and minus driving members for operating said rotary computing members, a plurality of transmission mechanisms for selectively connecting said rotary computing members with said plus and minus driving members, and a cycling mechanism comprising two Geneva gears, means for rotating said gears simultaneously in opposite directions through one revolution to constitute a cycle, a common operating member for said plus and minus driving members connected therewith to turn said plus and minus driving members simultaneously in opposite directions, and a Geneva pinion cooperating with each of said gears, said pinions being arranged to turn said common operating member, whereby said plus and minus driving members are rotated a predetermined number of revolutions in each direction during said cycle.

22. In an elapsed time computer, a series of rotary computing members, computing mechanism operated thereby, plus and minus driving members for operating said rotary computing members, a plurality of transmission mechanisms for selectively connecting said rotary computing members with said plus and minus driving members, and a cycling mechanism comprising two Geneva gears each including a toothed portion and a locking portion, means for rotating said gears simultaneously in opposite directions through one revolution to constitute a cycle, a Geneva pinion cooperating with each of said gears, the locking portions of said Geneva gears being arranged to release both of said pinions when either of said pinions is engaged by the toothed portion of either of said gears, a common operating member connected to turn said plus and minus driving members simultaneously in opposite directions, and said Geneva pinions being arranged to turn said common operating member, whereby said plus and minus driving members are rotated a predetermined number of revolutions in each direction during said cycle.

23. In an elapsed time recorder, a card perforating and sensing mechanism comprising a card receiver, a series of punches and means for slidably supporting said individual punches in operative relation to said receiver to punch holes in a card inserted therein, an actuating member for each of said punches, common operating means for said actuating members, selective control means to determine which of said punches shall be actuated by the operation of said common punch operating means, a pair of sensing members corresponding to each of said punches and movable in predetermined paths, one of said members of each pair being associated with said card receiver to sense the card therein as to whether it is perforated at that location, and a part operated by the actuating member of said punch into and out of the path of said other sensing member of each pair to cause said member to sense whether the operation of said punch operating member causes a perforation to be made in the card by said punch.

24. In an elapsed time recorder as claimed in claim 23, mechanism operated by the electric motor for resetting the switch actuating lever.

References Cited in the file of this patent

UNITED STATES PATENTS

| 1,084,671 | Tallmadge | Jan. 20, 1914 |
| 1,582,333 | Bryce | Apr. 27, 1926 |
| 2,150,578 | Chase | Mar. 14, 1939 |
| 2,294,739 | Connolly | Sept. 1, 1942 |
| 2,545,460 | Hall | Mar. 20, 1951 |
| 2,591,448 | Lorenz | Apr. 1, 1952 |

FOREIGN PATENTS

| 113,791 | Great Britain | May 20, 1920 |